US012374917B2

(12) United States Patent
Park

(10) Patent No.: US 12,374,917 B2
(45) Date of Patent: Jul. 29, 2025

(54) WEARABLE APPARATUS FOR PERFORMING WIRELESS POWER TRANSMISSION AND WIRELESS COMMUNICATION AND OPERATING METHOD THEREOF

(71) Applicant: Samsung Electronics Co., Ltd., Suwon-si (KR)

(72) Inventor: Yonghyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 18/521,493

(22) Filed: Nov. 28, 2023

(65) Prior Publication Data

US 2024/0146090 A1    May 2, 2024

Related U.S. Application Data

(63) Continuation of application No. PCT/KR2023/014298, filed on Sep. 20, 2023.

(30) Foreign Application Priority Data

Oct. 26, 2022    (KR) .................. 10-2022-0139177

(51) Int. Cl.
*H02J 7/14*    (2006.01)
*A41D 1/00*    (2018.01)
(Continued)

(52) U.S. Cl.
CPC ............ *H02J 7/1415* (2013.01); *A41D 1/002* (2013.01); *H02J 50/10* (2016.02); *H02J 7/0063* (2013.01)

(58) Field of Classification Search
CPC ........ H02J 7/1415; H02J 50/10; H02J 7/0063; A41D 1/002
(Continued)

(56) References Cited

U.S. PATENT DOCUMENTS 9,958,345 B2    5/2018    Ichikawa et al.
10,528,081 B2 *   1/2020    Wong .................. A41F 9/002
(Continued)

FOREIGN PATENT DOCUMENTS

CN    205377461 U    7/2016
CN    111683500 A    9/2020
(Continued)

OTHER PUBLICATIONS

PCT International Search Report dated Dec. 21, 2023 for PCT/KR2023/014298.
PCT Written Opinion dated Dec. 21, 2023 for PCT/KR2023/014298.

*Primary Examiner* — Alfonso Perez Borroto
(74) *Attorney, Agent, or Firm* — Nixon & Vanderhye P.C.

(57) ABSTRACT

Disclosed is a wearable apparatus to be worn on a body of a user, the wearable apparatus including a driving module configured to generate power to be applied to the user, an output link connected to the driving module, the output link including a torque sensor module configured to generate torque data by measuring a torque generated by at least one of an operation of the driving module and a motion of the user, a wireless power transmitter configured to perform wireless power transmission, a wireless power receiver configured to receive wireless power transmitted by the wireless power transmitter, convert the received wireless power, supply the converted wireless power to the torque sensor module, receive the torque data from the torque sensor module, and transmit the received torque data to the power transmitter, and a processor configured to receive the torque data from the wireless power transmitter through the driving module, generate a control signal for controlling the (Continued)

driving module based on the torque data and motion information of the user, and control the driving module based on the generated control signal.

20 Claims, 19 Drawing Sheets

(51) Int. Cl.
*H02J 50/10* (2016.01)
*H02J 7/00* (2006.01)

(58) Field of Classification Search
USPC .......................................... 307/104
See application file for complete search history.

(56) References Cited

U.S. PATENT DOCUMENTS

| | | | |
|---|---|---|---|
| 11,139,696 B2 | 10/2021 | Yonezawa | |
| 2012/0158179 A1* | 6/2012 | Ooga | B25J 9/1697 901/47 |
| 2013/0019503 A1* | 1/2013 | Vogt | A43B 7/082 320/108 |
| 2013/0123671 A1* | 5/2013 | Ikeuchi | H02P 29/032 318/504 |
| 2014/0130381 A1* | 5/2014 | Jung | A43B 1/0045 320/108 |
| 2016/0327444 A1 | 11/2016 | Ichikawa et al. | |
| 2018/0272525 A1* | 9/2018 | Kumeno | B25J 9/1638 |
| 2020/0093014 A1* | 3/2020 | Merenda | H04R 1/1025 |
| 2021/0281117 A1 | 9/2021 | Yonezawa | |
| 2022/0143846 A1 | 5/2022 | Wang et al. | |
| 2022/0210628 A1* | 6/2022 | Ka Dlamini | A61B 5/6804 |

FOREIGN PATENT DOCUMENTS

| | | |
|---|---|---|
| JP | 2013-138848 A | 7/2013 |
| JP | 2015115017 A | 6/2015 |
| JP | 2020163498 A | 10/2020 |
| KR | 10-2017-0004648 A | 1/2017 |
| KR | 10-1913187 B1 | 1/2019 |
| KR | 10-2019-0078107 A | 7/2019 |

* cited by examiner

WEARABLE APPARATUS FOR PERFORMING WIRELESS POWER TRANSMISSION AND WIRELESS COMMUNICATION AND OPERATING METHOD THEREOF

CROSS-REFERENCE TO RELATED APPLICATIONS

This application is a continuation application of International Application No. PCT/KR2023/014298 designating the United States, filed on Sep. 20, 2023, in the Korean Intellectual Property Receiving Office and claiming priority to Korean Patent Application No. 10-2022-0139177, filed on Oct. 26, 2022, in the Korean Intellectual Property Office, the disclosures of which are all hereby incorporated by reference herein in their entireties.

BACKGROUND

1. Field

Certain example embodiments relate to a wearable apparatus and/or a robot (e.g., a manipulator, etc.) for performing wireless power transmission and wireless communication and/or an operating method thereof.

2. Description of Related Art

A wearable apparatus may apply an external force to a user to help with an exercise of the user. For example, the wearable apparatus may provide the user with an assistance force to assist a motion (e.g., walking, running, lifting, etc.) of the user and/or may provide the user with a resistance force to act as resistance to a motion of the user.

SUMMARY

A wearable apparatus may include a motor configured to generate a torque and an output link configured to transmit the torque generated by the motor to a driving frame. A sensor (e.g., one or more of a torque sensor, a wearing detection sensor, etc.) may be positioned in the output link, and wires (e.g., a wire for transmitting and receiving sensing data and a power cable) may be connected, directly or indirectly, to the sensor. The sensor may receive power through the power cable and transmit and receive sensing data through the wire. However, when the motor rotates, the wires connected to the sensor may be twisted. To solve this issue, a hollow motor including a hole may be used. The wires may be connected to the sensor through at least the hole of the hollow motor. In this case, the volume of the driving module may increase due to the hole of the hollow motor, which may impede reduction in size of the wearable apparatus. The weight of the wires and a connector may impede reduction in weight of the wearable apparatus.

According to an example embodiment, a wearable apparatus to be worn on a body of a user may include a driving module configured to generate power to be applied to the user, an output link connected, directly or indirectly, to the driving module, the output link including a torque sensor module configured to generate torque data by measuring a torque generated by at least one of an operation of the driving module and a motion of the user, a wireless power transmitter configured to perform wireless power transmission, a wireless power receiver configured to receive wireless power transmitted by the wireless power transmitter, convert the received wireless power, supply the converted wireless power to the torque sensor module, receive the torque data from the torque sensor module, and transmit the received torque data to the power transmitter, and a processor configured to receive the torque data from the wireless power transmitter through the driving module, generate a control signal for controlling the driving module based on the torque data and motion information of the user, and control the driving module based on the generated control signal.

According to an example embodiment, a wearable apparatus to be worn on a body of a user may include a driving module configured to generate power to be applied to the user, an output link connected, directly or indirectly, to the driving module, the output link including a torque sensor module configured to generate torque data by measuring a torque generated by at least one of an operation of the driving module and a motion of the user, a wireless power transmitter configured to perform wireless power transmission, a wireless power receiver configured to receive wireless power transmitted by the wireless power transmitter, convert the received wireless power, and supply the converted wireless power to the torque sensor module, a wireless communication unit configured to receive the torque data from the torque sensor module, and a processor configured to receive the torque data from the wireless communication unit, generate a control signal for controlling the driving module based on the torque data and motion information of the user, and control the driving module based on the generated control signal.

According to an example embodiment, an operating method of a wearable apparatus may include applying power generated by a driving module to a user, transmitting, by a wireless power transmitter in the wearable apparatus, wireless power to a wireless power receiver in the wearable apparatus, converting, by the wireless power receiver, the wireless power, supplying, by the wireless power receiver, the converted wireless power to a torque sensor module in the wearable apparatus, generating, by the torque sensor module in the wearable apparatus, torque data by measuring a torque generated by at least one of an operation of the driving module and a motion of the user, transmitting, by the wireless power receiver, the torque data to the wireless power transmitter, transmitting, by the wireless power transmitter, the torque data to a processor, generating, by the processor, a control signal for controlling the driving module based on the torque data and motion information of the user, and controlling, by the processor, the driving module based on the generated control signal.

An example embodiment may supply power wirelessly to a sensor positioned in an output link and obtain sensing data of the sensor through wireless communication. Accordingly, an embodiment may not require a wire, a power cable, and a connector for transmitting and receiving sensing data of the sensor and thus, may achieve reduction in size and weight of a wearable apparatus.

An example embodiment may fix a transmission coil for wireless power transmission and a reception coil for wireless power reception in a wearable apparatus, thereby preventing or reducing a misalign between the transmission coil and the reception coil and maintaining a predetermined distance between the transmission coil and the reception coil. Accordingly, a wireless power transmitter and a wireless power receiver in the wearable apparatus may perform a simplified wireless charging protocol and may verify the compatibility of wireless power communication through a simple procedure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
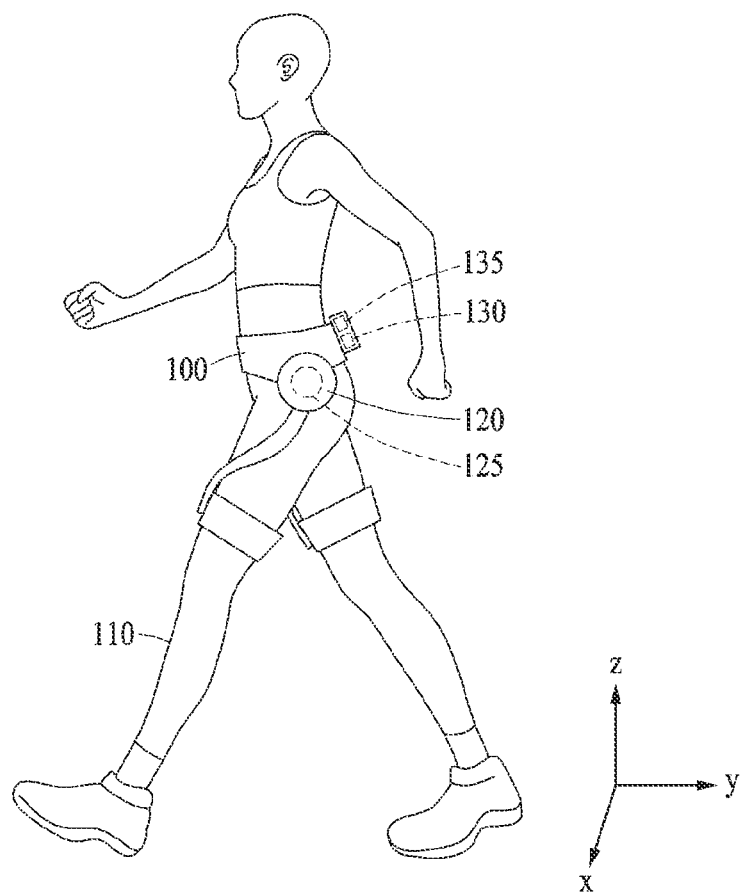
FIG. 1 is a diagram illustrating an overview of a wearable apparatus worn on a body of a user according to an example embodiment.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, at least a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating an overview of a wearable apparatus worn on a body of a user according to an embodiment.

Referring to FIG. 1, in an embodiment, a wearable apparatus 100 may be a device worn on a body of a user 110 to assist the user 110 in walking, exercising, and/or working. In an embodiment, the wearable apparatus 100 may be used to measure a physical ability (e.g., a walking ability, an exercise ability, or an exercise posture) of the user 110. In embodiments, the term "wearable apparatus" may be replaced with "wearable robot," "walking assistance device," or "exercise assistance device". The user 110 may be a human or an animal, but is not limited thereto. The wearable apparatus 100 may be worn on a body (e.g., a lower body (the legs, ankles, knees, etc.), an upper body (the torso, arms, wrists, etc.), or the waist) of the user 110 to apply an external force such as an assistance force and/or a resistance force to a body motion of the user 110. The assistance force may be a force applied in the same direction as the body motion direction of the user 110, the force to assist a body motion of the user 110. The resistance force may be a force applied in a direction opposite to the body motion direction of the user 110, the force hindering a body motion of the user 110. The term "resistance force" may also be referred to as "exercise load".

In an embodiment, the wearable apparatus 100 may operate in a walking assistance mode for assisting the user 110 in walking. In the walking assistance mode, the wearable apparatus 100 may assist the user 110 in walking by applying an assistance force generated by the driving module 120 of the wearable apparatus 100 to the body of the user 110. The wearable apparatus 100 may allow the user 110 to walk independently or to walk for a long time by providing a force required for walking of the user 110, to expand a walking ability of the user 110. The wearable apparatus 100 may help in improving an abnormal walking habit or walking posture of a walker.

In an embodiment, the wearable apparatus 100 may operate in an exercise assistance mode for enhancing the exercise effect of the user 110. In the exercise assistance mode, the wearable apparatus 100 may hinder a body motion of the user 110 or provide resistance to a body motion of the user 110 by applying a resistance force generated by the driving module 120 to the body of the user 110. When the wearable apparatus 100 is a hip-type wearable apparatus that is worn on the waist (or pelvis) and legs (e.g., thighs) of the user 110, the wearable apparatus 100 may provide an exercise load to a leg motion of the user 110 while being worn on the legs, thereby enhancing the exercise effect on the legs of the user 110. In an embodiment, the wearable apparatus 100 may apply an assistance force to the body of the user 110 to assist the user 110 in exercising. For example, when a handicapped person or an elderly person wants to exercise wearing the wearable apparatus 100, the wearable apparatus 100 may provide an assistance force for assisting a body motion during the exercise process. In an embodiment, the wearable apparatus 100 may provide an assistance force and a resistance force in combination for each exercise section or time section, in such a manner of providing an assistance force in some exercise sections and a resistance force in other exercise sections.

In an embodiment, the wearable apparatus 100 may operate in a physical ability measurement mode for measuring a physical ability of the user 110. The wearable apparatus 100 may measure motion information of a user using sensors (e.g., an angle sensor 125 and an inertial measurement unit (IMU) 135) provided in the wearable apparatus 100 while the user is walking or exercising, and evaluate the physical ability of the user based on the measured motion information. For example, a gait index or an exercise ability indicator (e.g., the muscular strength, endurance, balance, or exercise posture) of the user 110 may be estimated through the motion information of the user 110 measured by the wearable apparatus 100. The physical ability measurement mode may include an exercise posture measurement mode for measuring an exercise posture of a user.

In various embodiments, for convenience of description, the wearable apparatus 100 is described as an example of a hip-type wearable apparatus, as illustrated in FIG. 1, but the embodiments are not limited thereto. As described above, the wearable apparatus 100 may be worn on another body part (e.g., the upper arms, lower arms, hands, calves, and feet) other than the waist and legs (particularly, the thighs), and the shape and configuration of the wearable apparatus 100 may vary depending on the body part on which the wearable apparatus 100 is worn.

In addition, embodiments of the wearable apparatus 100 to be described below may apply to a robot (e.g., a manipulator, etc.).

Figure 3:
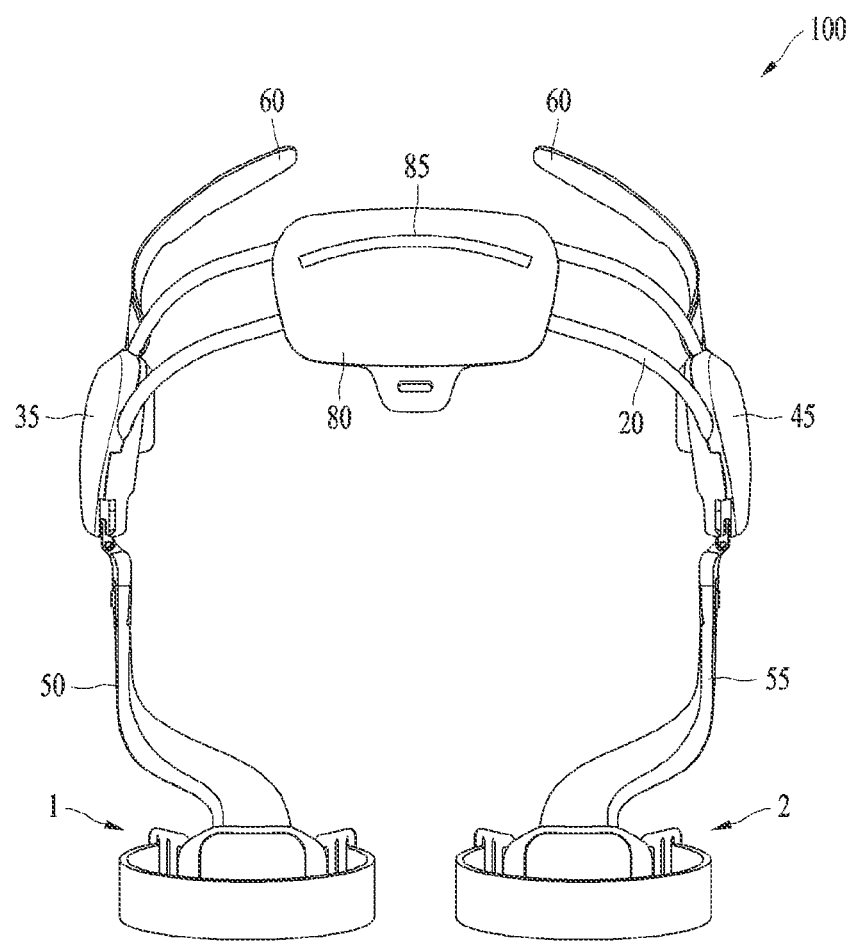
FIG. 3 is a rear schematic diagram illustrating a wearable apparatus according to an example embodiment.

According to an embodiment, the wearable apparatus 100 may include a support frame (e.g., leg support frames 50 and 55 and a waist support frame 20 of FIG. 3) configured to support the body of the user 110 when the wearable apparatus 100 is worn on the body of the user 110, a sensor module (e.g., a sensor module 520 of FIG. 5A, comprising a sensor) configured to obtain sensor data including motion information about a body motion (e.g., a leg motion and an upper body motion) of the user 110, the driving module 120 (e.g., driving modules 35 and 45 of FIG. 3) configured to generate a torque to be applied to the legs of the user 110, and a control module 130 (e.g., a control module 510 of FIGS. 5A and 5B, comprising circuitry) configured to control the wearable apparatus 100.

The sensor module may include the angle sensor 125 and the IMU 135. The angle sensor 125 may measure the rotational angle of a leg support frame of the wearable apparatus 100 corresponding to the hip joint angle value of the user 110. The rotational angle of the leg support frame measured by the angle sensor 125 may be estimated as the hip joint angle value (or leg angle value) of the user 110. The angle sensor 125 may include, for example, an encoder and/or a Hall sensor. In an embodiment, the angle sensor 125 may be present near each of the right hip joint and the left hip joint of the user 110. The IMU 135 may include an acceleration sensor and/or an angular velocity sensor, and may measure a change in acceleration and/or angular velocity according to a motion of the user 110. The IMU 135 may measure, for example, an upper body motion value of the user 110 corresponding to a motion value of a waist support frame (or a base body (a base body 80 of FIG. 3)) of the wearable apparatus 100. The motion value of the waist support frame measured by the IMU 135 may be estimated as the upper body motion value of the user 110.

In an embodiment, the control module 130 and the IMU 135 may be arranged within the base body (e.g., the base body 80 of FIG. 3) of the wearable apparatus 100. The base body may be positioned on the lumbar region (an area of the lower back) of the user 110 while the user 110 is wearing the wearable apparatus 100. The base body may be formed or attached to the outer side of the waist support frame of the wearable apparatus 100. The base body may be mounted on the lumbar region of the user 110 to provide a cushioning feeling to the lower back of the user 110 and may support the lower back of the user 110 together with the waist support frame.

In an embodiment, the control module 130 may determine the user 110's falling using the IMU 135. When the user 110 is lying on the floor due to falling, the waist angle of the user 110 (e.g., the angle between the waist of the user 110 and the z-axis) may be greater than or equal to a first angle (e.g., 45 degrees), for example. The control module 130 may determine that the user has fallen when the waist angle of the user is greater than or equal to the first angle according to the result of measurement by the IMU 135.

Figure 2:
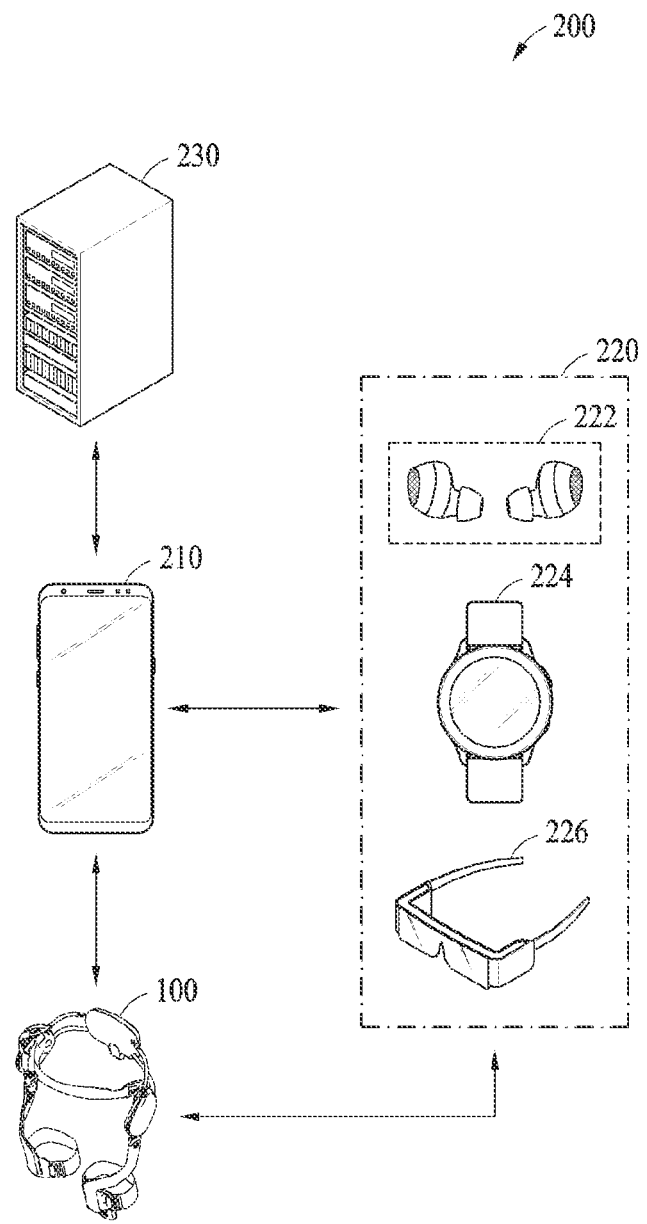
FIG. 2 is a diagram illustrating an exercise management system including a wearable apparatus and an electronic device according to an example embodiment.

FIG. 2 is a diagram illustrating an exercise management system including a wearable apparatus and an electronic device according to an embodiment.

Referring to FIG. 2, an exercise management system 200 may include the wearable apparatus 100 to be worn on a body of a user, an electronic device 210, another wearable apparatus 220, and a server 230. In an embodiment, at least one (e.g., the other wearable apparatus 220 or the server 230) of these devices may be omitted from the exercise management system 200, or one or more other devices (e.g., an exclusive controller device of the wearable apparatus 100) may be added to the exercise management system 200.

In an embodiment, the wearable apparatus 100 may be worn on a body of the user in a walking assistance mode to assist a motion of the user. For example, the wearable apparatus 100 may be worn on the legs of the user to help the user in walking by generating an assistance force for assisting a leg motion of the user.

In an embodiment, the wearable apparatus 100 may generate a resistance force for hindering a body motion of the user or an assistance force for assisting a body motion of the user and apply the generated resistance force or assistance force to the body of the user to enhance the exercise effect of the user in an exercise assistance mode. In the exercise assistance mode, the user may select, through the electronic device 210, an exercise program (e.g., squat, split lunge, dumbbell squat, lunge and knee up, stretching, or the like) to perform using the wearable apparatus 100 and/or an exercise intensity to be applied to the wearable apparatus 100. The wearable apparatus 100 may control a driving module of the wearable apparatus 100 according to the exercise program selected by the user and obtain sensor data including motion information of the user through a sensor module comprising a sensor. The wearable apparatus 100 may adjust the strength of the resistance force or assistance force applied to the user according to the exercise intensity selected by the user. For example, the wearable apparatus 100 may control the driving module to generate a resistance force corresponding to the exercise intensity selected by the user.

In an embodiment, the wearable apparatus 100 may be used to measure a physical ability of the user by interworking with the electronic device 210. The wearable apparatus 100 may operate in a physical ability measurement mode, which is a mode for measuring a physical ability of the user, under the control of the electronic device 210, and may transmit sensor data obtained by a motion of the user in the physical ability measurement mode to the electronic device 210. The electronic device 210 may estimate the physical ability of the user by analyzing the sensor data received from the wearable apparatus 100.

The electronic device 210 may communicate with the wearable apparatus 100 and may remotely control the wearable apparatus 100 or provide the user with state information about a state (e.g., a booting state, a charging state, a sensing state, or an error state) of the wearable apparatus 100. The electronic device 210 may receive the sensor data obtained by a sensor in the wearable apparatus 100 from the wearable apparatus 100 and estimate the physical ability of the user or an exercise result based on the received sensor data. In an embodiment, when the user exercises wearing the wearable apparatus 100, the wearable apparatus 100 may obtain sensor data including motion information of the user using sensors and transmit the obtained sensor data to the electronic device 210. The electronic device 210 may extract a motion value of the user from the sensor data and evaluate an exercise posture of the user based on the extracted motion value.

As will be described later, a torque sensor may be positioned between a motor of the wearable apparatus 100 and an output link of the wearable apparatus 100, and the torque sensor may measure a force of the user. The wearable apparatus 100 may apply a more suitable external force to the user based on the force measured by the torque sensor. The wearable apparatus 100 and/or the electronic device may coach the user on an exercise based on the sensor data described above and the force measured by the torque sensor.

The electronic device 210 may provide the user with an exercise posture measured value and exercise posture evaluation information related to the exercise posture of the user through a graphical user interface (GUI).

In an embodiment, the electronic device 210 may execute a program (e.g., an application) configured to control the wearable apparatus 100, and the user may adjust an operation or a set value of the wearable apparatus 100 (e.g., the intensity of torque output from a driving module (e.g., the driving modules 35 and 45 of FIG. 3), the volume of audio output from a sound output module (e.g., a sound output module 550 of FIGS. 5A and 5B), or the brightness of a lighting unit (e.g., a lighting unit 85 of FIG. 3) through the corresponding program. The program executed by the electronic device 210 may provide a GUI for interaction with the user. The electronic device 210 may include various types of devices. For example, the electronic device 210 may include a portable communication device (e.g., a smart phone), a computer device, an access point, a portable multimedia device, or a home appliance (e.g., a television, an audio device, or a projector device), but is not limited thereto.

According to an embodiment, the electronic device 210 may be connected to the server 230 using short-range wireless communication or cellular communication. The server 230 may receive user profile information of the user who uses the wearable apparatus 100 from the electronic device 210 and store and manage the received user profile information. The user profile information may include, for example, information about at least one of the name, age, gender, height, weight, or body mass index (BMI). The server 230 may receive exercise history information about an exercise performed by the user from the electronic device 210 and store and manage the received exercise history information. The server 230 may provide the electronic device 210 with various exercise programs or physical ability measurement programs that may be provided to the user.

According to an embodiment, the wearable apparatus 100 and/or the electronic device 210 may be connected to the other wearable apparatus 220. The other wearable apparatus 220 may include, for example, wireless earphones 222, a smart watch 224, or smart glasses 226, but is not limited thereto. In an embodiment, the smart watch 224 may measure a biosignal including heart rate information of the user and transmit the measured biosignal to the electronic device 210 and/or the wearable apparatus 100. The electronic device 210 may estimate the heart rate information (e.g., the current heart rate, maximum heart rate, and average heart rate) of the user based on the biosignal received from the smart watch 224 and provide the estimated heart rate information to the user.

In an embodiment, the exercise result information, physical ability information, and/or exercise posture evaluation information evaluated by the electronic device 210 may be transmitted to the other wearable apparatus 220 and provided to the user through the other wearable apparatus 220. State information of the wearable apparatus 100 may also be transmitted to the other wearable apparatus 220 and provided to the user through the other wearable apparatus 220. In an embodiment, the wearable apparatus 100, the electronic device 210, and the other wearable apparatus 220 may be connected to each other through wireless communication (e.g., Bluetooth communication or Wi-Fi communication).

In an embodiment, the wearable apparatus 100 may provide (or output) feedback (e.g., visual feedback, auditory feedback, or haptic feedback) corresponding to the state of the wearable apparatus 100 according to the control signal received from the electronic device 210. For example, the wearable apparatus 100 may provide visual feedback through the lighting unit (e.g., the lighting unit 85 of FIG. 3) and provide auditory feedback through the sound output module (e.g., the sound output module 550 of FIGS. 5A and 5B). The wearable apparatus 100 may include a haptic module and provide haptic feedback in the form of vibration to the body of the user through the haptic module. The electronic device 210 may also provide (or output) feedback (e.g., visual feedback, auditory feedback, or haptic feedback) corresponding to the state of the wearable apparatus 100.

In an embodiment, the electronic device 210 may present a personalized exercise goal to the user in the exercise assistance mode. The personalized exercise goal may include respective target amounts of exercise for exercise types (e.g., strength exercise, balance exercise, and aerobic exercise) desired by the user, determined by the electronic device 210 and/or the server 230. When the server 230 determines a target amount of exercise, the server 230 may transmit information about the determined target amount of exercise to the electronic device 210. The electronic device 210 may personalize and present the target amounts of exercise for the exercise types, such as strength exercise, aerobic exercise, and balance exercise, according to a desired exercise program (e.g., squat, split lunge, or a lunge and knee up) and/or the physical characteristics (e.g., the age, height, weight, and BMI) of the user. The electronic device 210 may display a GUI screen displaying the target amounts of exercise for the respective exercise types on a display.

In an embodiment, the electronic device 210 and/or the server 230 may include a database in which information about a plurality of exercise programs to be provided to the user through the wearable apparatus 100 is stored. To achieve an exercise goal of the user, the electronic device 210 and/or the server 230 may recommend an exercise program suitable for the user. The exercise goal may include, for example, at least one of muscle strength improvement, physical strength improvement, cardiovascular endurance improvement, core stability improvement, flexibility improvement, or symmetry improvement. The electronic device 210 and/or the server 230 may store and manage the exercise program performed by the user, the results of performing the exercise program, and the like.

Figure 4:
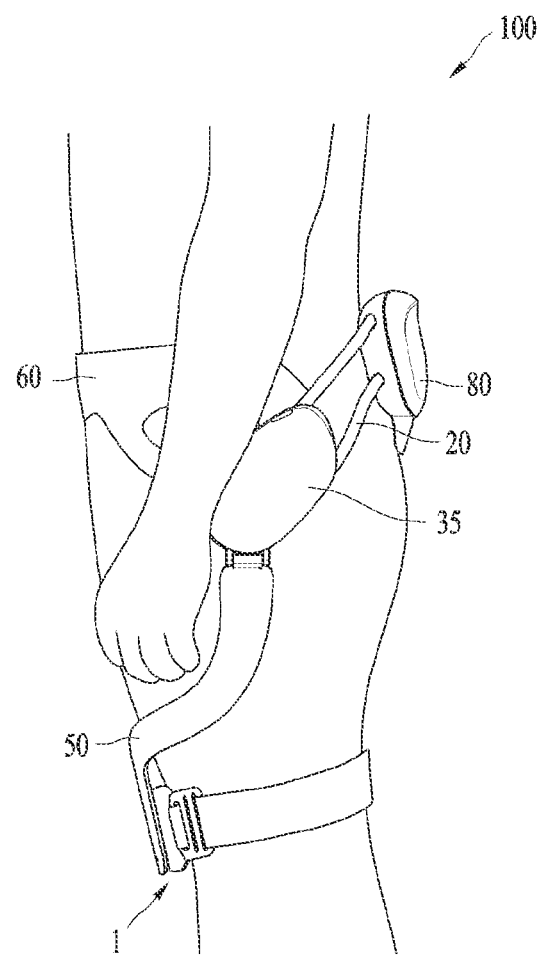
FIG. 4 is a left side view of a wearable apparatus according to an example embodiment.

FIG. 3 is a rear schematic diagram illustrating a wearable apparatus according to an embodiment. FIG. 4 is a left side view of a wearable apparatus according to an embodiment.

Referring to FIGS. 3 and 4, the wearable apparatus 100 according to an embodiment may include the base body 80, the waist support frame 20, the driving modules 35 and 45, the leg support frames 50 and 55, thigh fastening portions 1 and 2, and a waist fastening portion 60. The base body 80 may include the lighting unit 85. In an embodiment, at least one (e.g., the lighting unit 85) of these components may be omitted from the wearable apparatus 100, or one or more other components (e.g., a haptic module) may be added to the wearable apparatus 100.

The base body 80 may be positioned on the lumbar region of a user while the user is wearing the wearable apparatus 100. The base body 80 may be mounted on the lumbar region of the user to provide a cushioning feeling to the lower back of the user and may support the lower back of the user. The base body 80 may be hung on the hip region (an area of the hips) to prevent or reduce a chance of the wearable apparatus 100 from being separated downward due to gravity while the user is wearing the wearable apparatus 100. The base body 80 may distribute a portion of the weight of the wearable apparatus 100 to the lower back of the user while the user is wearing the wearable apparatus 100. The base body 80 may be connected, directly or indirectly, to the waist support frame 20. Waist support frame connecting elements (not shown) to be connected, directly or indirectly, to the waist support frame 20 may be provided at both end portions of the base body 80.

In an embodiment, the lighting unit 85 may be arranged on the outer side of the base body 80. The lighting unit 85 may include a light source (e.g., a light-emitting diode (LED)). The lighting unit 85 may emit light under the control of a control module (not shown) (e.g., the control module 510 of FIGS. 5A and 5B). In some embodiments, the control module may control the lighting unit 85 to provide (or output) visual feedback corresponding to the state of the wearable apparatus 100 to the user through the lighting unit 85.

The waist support frame 20 may extend from both end portions of the base body 80. The lumbar region of the user may be accommodated inside the waist support frame 20. The waist support frame 20 may include at least one rigid body beam. Each beam may be in a curved shape having a preset curvature to enclose the lumbar region of the user. The waist fastening portion 60 may be connected, directly or indirectly, to an end portion of the waist support frame 20. The driving modules 35 and 45 may be connected, directly or indirectly, to the waist support frame 20.

In an embodiment, the control module, an IMU (not shown) (e.g., the IMU 135 of FIG. 1 or an IMU 522 of FIG. 5B), a communication module (not shown) (e.g., a communication module 516 of FIGS. 5A and 5B, comprising communication circuitry), and a battery (not shown) may be arranged inside the base body 80. The base body 80 may protect the control module, the IMU, the communication module, and the battery. The control module may generate a control signal for controlling the operation of the wearable apparatus 100. The control module may include a control circuit including a processor configured to control actuators of the driving modules 35 and 45 and a memory. The control module may further include a power supply module (not shown) configured to supply power from the battery to each of the components of the wearable apparatus 100.

In an embodiment, the wearable apparatus 100 may include a sensor module (not shown) (e.g., the sensor module 520 of FIG. 5A) configured to obtain sensor data from at least one sensor. The sensor module may obtain sensor data that changes according to a motion of the user. In an embodiment, the sensor module may obtain sensor data including motion information of the user and/or motion information of the components of the wearable apparatus 100. The sensor module may include, for example, an IMU (e.g., the IMU 135 of FIG. 1 or the IMU 522 of FIG. 5B) configured to measure an upper body motion value of the user or a motion value of the waist support frame 20 and an angle sensor (e.g., the angle sensor 125 of FIG. 1 or a first angle sensor 524 and a second angle sensor 524-1 of FIG. 5B) configured to measure a hip joint angle value of the user or a motion value of the leg support frames 50 and 55, but is not limited thereto. For example, the sensor module may further include at least one of a position sensor, a temperature sensor, a biosignal sensor, or a proximity sensor.

The waist fastening portion 60 may be connected, directly or indirectly, to the waist support frame 20 to fasten the waist support frame 20 to the waist of the user. The waist fastening portion 60 may include, for example, a pair of belts.

The driving modules 35 and 45 may generate an external force (or torque) to be applied to the body of the user based on the control signal generated by the control module. For example, the driving modules 35 and 45 may generate an assistance force or resistance force to be applied to the legs of the user. In an embodiment, the driving modules 35 and 45 may include a first driving module 45 arranged in a position corresponding to the position of the right hip joint of the user and a second driving module 35 arranged in a position corresponding to the position of the left hip joint of the user. The first driving module 45 may include a first actuator and a first joint member, and the second driving module 35 may include a second actuator and a second joint member. The first actuator may provide power to be transmitted to the first joint member, and the second actuator may provide power to be transmitted to the second joint member. The first actuator and the second actuator may each include a motor configured to generate power (or a torque) by receiving electric power from the battery. When the motor is supplied with electric power and driven, the motor may generate a force (an assistance force) for assisting a body motion of the user or a force (a resistance force) for hindering a body motion of the user. In an embodiment, the control module may adjust the strength and direction of the force generated by the motor by adjusting the voltage and/or current supplied to the motor.

In an embodiment, the first joint member and the second joint member may receive power from the first actuator and the second actuator, respectively, and may apply an external force to the body of the user based on the received power. The first joint member and the second joint member may be arranged at positions corresponding to the joints of the user, respectively. One side of the first joint member may be connected, directly or indirectly, to the first actuator, and the other side of the first joint member may be connected, directly or indirectly, to a first leg support frame 55. The first joint member may be rotated by the power received from the first actuator. An encoder or a Hall sensor that may operate as an angle sensor configured to measure the rotational angle of the first joint member (corresponding to the joint angle of the user) may be arranged on one side of the first joint member. One side of the second joint member may be connected, directly or indirectly, to the second actuator, and the other side of the second joint member may be connected, directly or indirectly, to a second leg support frame 50. The second joint member may be rotated by the power received from the second actuator. An encoder or a Hall sensor that may operate as an angle sensor configured to measure the rotational angle of the second joint member may be arranged on one side of the second joint member.

In an embodiment, the first actuator may be arranged in a lateral direction of the first joint member, and the second actuator may be arranged in a lateral direction of the second joint member. A rotation axis of the first actuator and a rotation axis of the first joint member may be spaced apart from each other, and a rotation axis of the second actuator and a rotation axis of the second joint member may also be spaced apart from each other. However, embodiments are not limited thereto, and an actuator and a joint member may share a rotation axis. In an embodiment, each actuator may be spaced apart from a corresponding joint member. In this case, each of the driving modules 35 and 45 may further include a power transmission module (not shown) configured to transmit power from the actuator to the joint member. The power transmission module may be a rotary body, such as a gear, or a longitudinal member, such as a wire, a cable, a string, a spring, a belt, or a chain. However, the scope of the embodiment is not limited by the positional relationship between an actuator and a joint member and the power transmission structure described above.

In an embodiment, the leg support frames 50 and 55 may support the legs (e.g., thighs) of the user when the wearable apparatus 100 is worn on the legs of the user. For example, the leg support frames 50 and 55 may transmit power (a torque) generated by the driving modules 35 and 45 to the thighs of the user, and the power may act as an external force to be applied to a motion of the legs of the user. As one end portions of the leg support frames 50 and 55 are connected, directly or indirectly, to the joint members to rotate and the other end portions of the leg support frames 50 and 55 are connected, directly or indirectly, to the thigh fastening portions 1 and 2, the leg support frames 50 and 55 may transmit the power generated by the driving modules 35 and 45 to the thighs of the user while supporting the thighs of the user. For example, the leg support frames 50 and 55 may push or pull the thighs of the user. The leg support frames 50 and 55 may extend in the longitudinal direction of the thighs of the user. The leg support frames 50 and 55 may be bent to surround at least a portion of the circumference of the thighs of the user. The leg support frames 50 and 55 may include the first leg support frame 55 configured to support the right leg of the user and the second leg support frame 50 configured to support the left leg of the user.

In an embodiment, the wearable apparatus 100 may further include first and second output links (not shown) and first and second torque sensor modules (not shown).

In an embodiment, the first output link may be positioned between the first driving module 45 and the first leg support frame 55. One end portion of the first output link may be connected to the first driving module 45, and the other end portion of the first output link may be connected to the first leg support frame 55. Power generated by the first driving module 45 may be transmitted to the first leg support frame 55 through the first output link. The first torque sensor module may be positioned on the first output link. The first torque sensor module may be integrated with the first output link. The first torque sensor module may generate torque data by measuring a torque generated by at least one of a motion of the right leg of the user or an operation of the first driving module 45.

In an embodiment, the second output link may be positioned between the second driving module 35 and the second leg support frame 50. One end portion of the second output link may be connected to the second driving module 35, and the other end portion of the second output link may be connected to the second leg support frame 50. Power generated by the second driving module 35 may be transmitted to the second leg support frame 50 through the second output link. The second torque sensor module may be positioned on the second output link. The second torque sensor module may be integrated with the second output link. The second torque sensor module may generate torque data by measuring a torque generated by at least one of a motion of the left leg of the user or an operation of the second driving module 35.

In an embodiment, the wearable apparatus 100 may include a first wireless power transmitter, a first wireless power receiver, a second wireless power transmitter, and a second wireless power receiver. The first wireless power transmitter may be positioned, for example, in the first driving module 45, and the first wireless power receiver may be positioned, for example, in the first output link. The first wireless power transmitter may transmit wireless power to the first wireless power receiver. The first wireless power receiver may convert the wireless power and supply the converted wireless power to a component (e.g., the first torque sensor module, etc.) positioned in the first output link. The first wireless power receiver may transmit the torque data from the first torque sensor module to the first wireless power transmitter through wireless communication. The first wireless power transmitter may transmit the torque data to a processor of a control system through the first driving module 45 or may transmit the torque data directly to the processor of the control system, not through the first driving module 45.

In an embodiment, the second wireless power transmitter may be positioned, for example, in the second driving module 35, and the second wireless power receiver may be positioned, for example, in the second output link. The second wireless power transmitter may transmit wireless power to the second wireless power receiver. The second wireless power receiver may convert the wireless power and supply the converted wireless power to a component (e.g., the second torque sensor module, etc.) positioned in the second output link. The second wireless power receiver may transmit the torque data from the second torque sensor module to the second wireless power transmitter through wireless communication. The second wireless power transmitter may transmit the torque data to the processor of the control system through the second driving module 35 or may transmit the torque data directly to the processor of the control system, not through the second driving module 35.

In an embodiment, the thigh fastening portions 1 and 2 may be connected, directly or indirectly, to the leg support frames 50 and 55 and may fasten the leg support frames 50 and 55 to the thighs. The thigh fastening portions 1 and 2 may include a first thigh fastening portion 2 configured to fasten the first leg support frame 55 to the right thigh of the user and a second thigh fastening portion 1 configured to fasten the second leg support frame 50 to the left thigh of the user.

In an embodiment, the first thigh fastening portion 2 may include a first cover, a first fastening frame, and a first strap, and the second thigh fastening portion 1 may include a second cover, a second fastening frame, and a second strap. In an embodiment, the first cover and the second cover may apply torques generated by the driving modules 35 and 45 to the thighs of the user. For example, the first cover and the second cover may be arranged on one sides of the thighs of the user to push or pull the thigh of the user. The first cover and the second cover may be arranged on the front surfaces of the thighs of the user. The first cover and the second cover may be arranged in the circumferential directions of the thighs of the user. The first cover and the second cover may extend to both sides from the other end portions of the leg support frames 50 and 55 and may include curved surfaces corresponding to the thighs of the user. One ends of the first cover and the second cover may be connected, directly or indirectly, to the fastening frames, and the other ends thereof may be connected, directly or indirectly, to the straps.

The first fastening frame and the second fastening frames may be arranged, for example, to surround at least some portions of the circumferences of the thighs of the user, thereby preventing or reducing a chance of the thighs of the user from being separated from the leg support frames 50 and 55. The first fastening frame may have a fastening structure that connects the first cover and the first strap, and the second fastening frame may have a fastening structure that connects the second cover and the second strap.

The first strap may enclose the remaining portion of the circumference of the right thigh of the user that is not covered by the first cover and the first fastening frame, and the second strap may enclose the remaining portion of the circumference of the left thigh of the user that is not covered by the second cover and the second fastening frame. The first strap and the second strap may include, for example, an elastic material (e.g., a band).

Figure 5A:
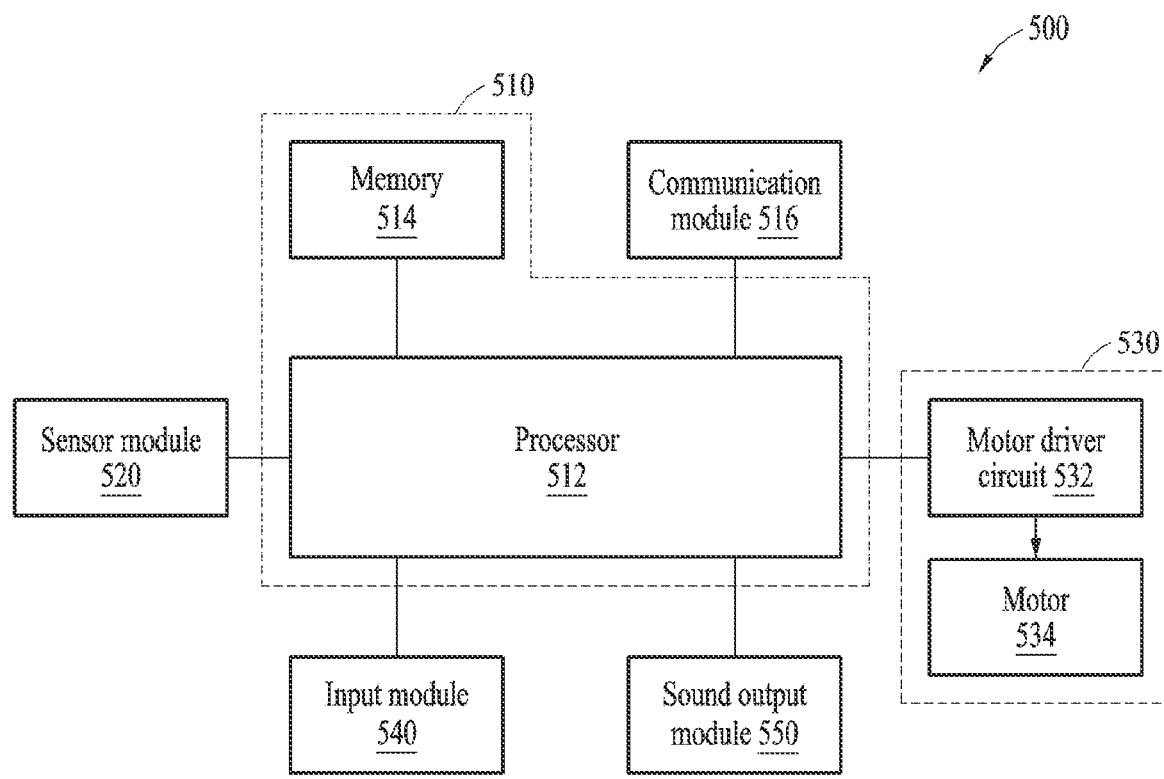
FIGS. 5A and 5B are diagrams illustrating a configuration of a control system of a wearable apparatus according to an example embodiment.
Figure 5B:
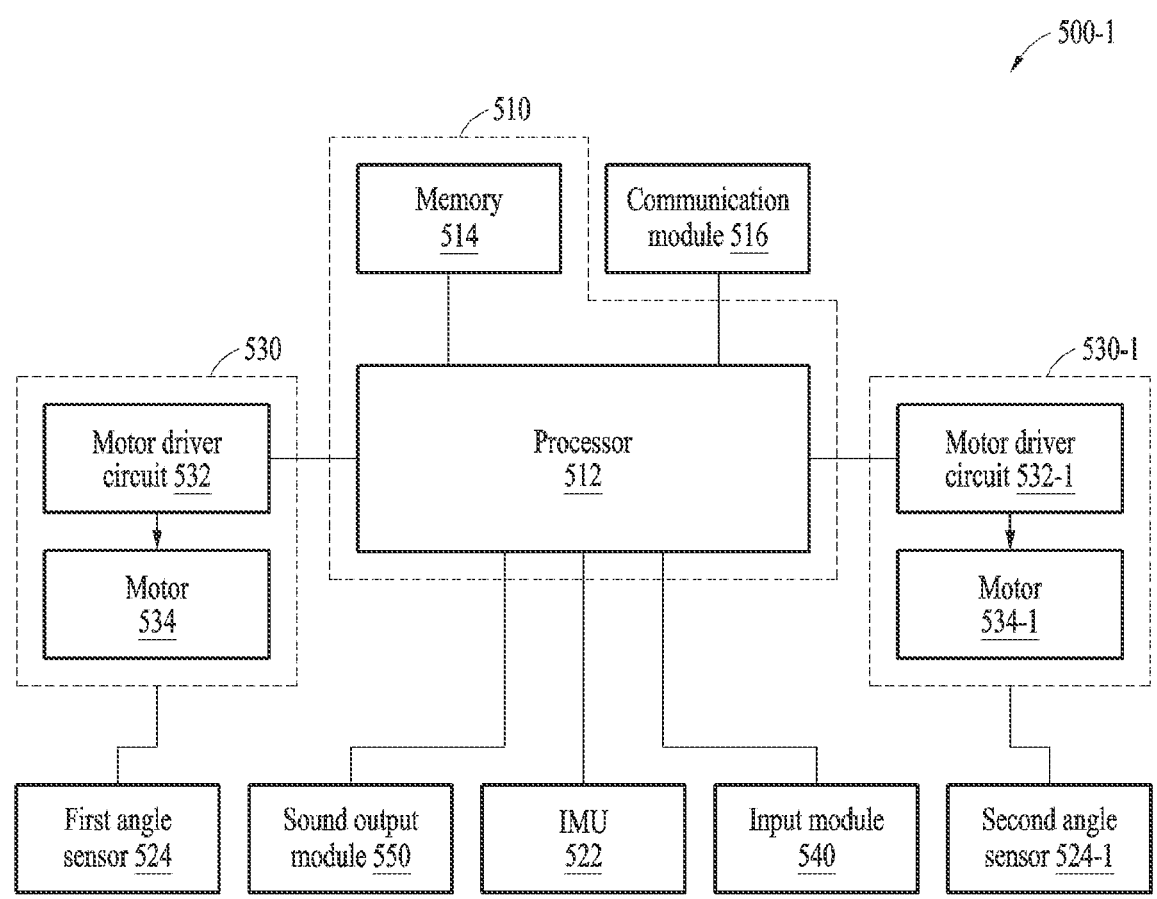

FIGS. 5A and 5B are diagrams illustrating a configuration of a control system of a wearable apparatus according to an embodiment.

Referring to FIG. 5A, the wearable apparatus 100 may be controlled by a control system 500. The control system 500 may include the control module 510, the communication module 516, the sensor module 520, a driving module 530, an input module 540, and the sound output module 550. In an embodiment, at least one (e.g., the sound output module 550) of these components may be omitted from the control system 500, or one or more other components (e.g., a haptic module) may be added to the control system 500.

The driving module 530 may include a motor 534 configured to generate power (e.g., a torque) and a motor driver circuit 532 configured to drive the motor 534. Although FIG. 5A illustrates the driving module 530 including one motor driver circuit 532 and one motor 534, the embodiment of FIG. 5A is merely an example. Referring to FIG. 5B, a control system 500-1 may include a plurality of (e.g., two or more) motor driver circuits 532 and 532-1 and a plurality of (e.g., two or more) motors 534 and 534-1. The driving module 530 including the motor driver circuit 532 and the motor 534 may correspond to the first driving module 45 of FIG. 3, and a driving module 530-1 including the motor driver circuit 532-1 and the motor 534-1 may correspond to the second driving module 35 of FIG. 3. The following description of the motor driver circuit 532 and the motor 534 may also apply to the motor driver circuit 532-1 and the motor 534-1 illustrated in FIG. 5B.

Referring back to FIG. 5A, the sensor module 520 may include a sensor circuit including at least one sensor. The sensor module 520 may obtain sensor data including motion information of a user or motion information of the wearable apparatus 100. The sensor module 520 may transmit the obtained sensor data to the control module 510. The sensor module 520 may include an IMU 522 and an angle sensor (e.g., a first angle sensor 524 and a second angle sensor 524-1) as illustrated in FIG. 5B. The IMU 522 may measure an upper body motion value of the user. For example, the IMU 522 may sense X-axis, Y-axis, and Z-axis accelerations and X-axis, Y-axis, and Z-axis angular velocities according to a motion of the user. The IMU 522 may be used to measure, for example, at least one of a forward and backward tilt, a left and right tilt, or a rotation of the body of the user. In addition, the IMU 522 may obtain motion values (e.g., acceleration values and angular velocity values) of a waist support frame (e.g., the waist support frame 20 of FIG. 3) of the wearable apparatus 100. The motion values of the waist support frame 20 may correspond to upper body motion values of the user.

The angle sensor may measure a joint angle value (e.g., a hip joint angle value according to a leg motion of the user. Sensor data that may be measured by the angle sensor may include, for example, a hip joint angle value of the right leg, a hip joint angle value of the left leg, and information about motion directions of the legs. For example, the first angle sensor 524 of FIG. 5B may obtain the hip joint angle value of the right leg of the user, and the second angle sensor 524-1 may obtain the hip joint angle value of the left leg of the user. The sensor data measured by the first angle sensor 524 may be transmitted to a processor 512 through the driving module 530 (e.g., a micro controller unit (MCU) in the driving module 530), and the sensor data measured by the second angle sensor 524-1 may be transmitted to the processor 512 through the driving module 530-1 (e.g., an MCU in the driving module 530-1). Embodiments are not limited thereto, and the sensor data measured by the first angle sensor 524 may be transmitted directly to the processor 512, and the sensor data measured by the second angle sensor 524-1 may be transmitted directly to the processor 512. The first angle sensor 524 and the second angle sensor 524-1 may each include, for example, an encoder and/or a Hall sensor. Further, the angle sensors may obtain motion values of the leg support frames of the wearable apparatus. For example, the first angle sensor 524 may obtain a motion value of the first leg support frame 55, and the second angle sensor 524-1 may obtain a motion value of the second leg support frame 50. The motion values of the leg support frames may correspond to the hip joint angle values.

In an embodiment, the sensor module 520 may further include at least one of a position sensor configured to obtain a position value of the wearable apparatus 100, a proximity sensor configured to sense the proximity of an object, a biosignal sensor configured to detect a biosignal of the user, or a temperature sensor configured to measure an ambient temperature.

The input module 540 may receive a command or data to be used by another component (e.g., the processor 512) of the wearable apparatus 100 from the outside (e.g., the user) of the wearable apparatus 100. The input module 540 may include input component circuit. The input module 540 may include, for example, a key (e.g., a button) or a touch screen.

The sound output module 550 may output a sound signal to the outside of the wearable apparatus 100. The sound output module 550 may provide auditory feedback to the user. For example, the sound output module 550 may include a speaker configured to play back a guiding sound signal (e.g., an operation start sound, an operation error alarm, or an exercise start alarm), music content, or a guiding voice for auditorily informing predetermined information (e.g., exercise result information or exercise posture evaluation information).

In an embodiment, the control system 500 may further include a battery (not shown) configured to supply power to each component of the wearable apparatus. The wearable apparatus may convert the power of the battery according to an operating voltage of each component of the wearable apparatus and supply the converted power to each component.

The driving module 530 may generate an external force to be applied to the legs of the user under the control of the control module 510. The driving module 530 may generate a torque to be applied to the legs of the user based on a control signal generated by the control module 510. The control module 510 may transmit the control signal to the motor driver circuit 532. The motor driver circuit 532 may control the operation of the motor 534 by generating a current signal (or voltage signal) corresponding to the control signal and supplying the generated current signal (or voltage signal) to the motor 534. In some cases, the current signal may not be supplied to the motor 534. When the motor 534 is supplied with the current signal and driven, the motor 534 may generate a torque for an assistance force for assisting a leg motion of the user or a resistance force for hindering a leg motion of the user.

The control module 510 may control the overall operation of the wearable apparatus and may generate a control signal for controlling each component (e.g., the communication module 516 or the driving module 530). The control module 510 may include the processor 512 and a memory 514.

The processor 512 may execute, for example, software to control at least one other component (e.g., a hardware or software component) of the wearable apparatus connected, directly or indirectly, to the processor 512, and may perform a variety of data processing or computation. The software may include an application for providing a GUI. According to an embodiment, as at least part of data processing or computation, the processor 512 may store instructions or data received from another component (e.g., the communication module 516) in the memory 514, process the instructions or data stored in the memory 514, and store result data obtained as a result of processing in the memory 514. According to an embodiment, the processor 512 may include a main processor (e.g., a central processing unit (CPU) or an application processor (AP)) or an auxiliary processor (e.g., a graphics processing unit (GPU), a neural processing unit (NPU), an image signal processor (ISP), a sensor hub processor, or a communication processor (CP)) that is operable independently of or in conjunction with the main processor. The auxiliary processor may be implemented separately from the main processor or as part of the main processor.

In an embodiment, the processor 512 may generate a control signal for generating a torque of the driving module 530 and control the driving module 530 based on the generated control signal. For example, the processor 512 may determine a state factor y(t) indicating a state of a motion of the user according to an equation $y(t) = \sin(q_r(t)) - \sin(q_l(t))$. $q_r(t)$ may denote a first hip joint angle value (e.g., a right hip joint angle value), and $q_l(t)$ may denote a second hip joint angle value (e.g., a left hip joint angle value).

The processor 512 may determine a control signal τ(t) for generating a torque of the driving module 530 according to an equation $\tau(t) = \kappa y(t-\Delta t)$. A gain κ may be a parameter indicating the magnitude and direction of an output torque. As the value of the gain κ increases, a greater torque may be output. If the gain κ is negative, a torque acting as a resistance force may be output to the user, and if the gain κ is positive, a torque acting as an assistance force may be output to the user. A delay Δt may be a parameter associated with a torque output timing. The value of the gain κ and/or the value of the delay Δt may be preset. Alternatively, the value of the gain κ and/or the value of the delay Δt may be adjustable by the electronic device 210.

In an embodiment, the processor 512 may determine a control signal $\tau_r(t)$ for generating a torque by the driving module 530 of FIG. 5B according to an equation $\tau_r(t) = \tau(t)$ and determine a control signal $\tau_l(t)$ for generating a torque by the driving module 530-1 according to $\tau_l(t) = -\tau(t)$.

The memory 514 may store a variety of data used by at least one component (e.g., the processor 512) of the control module 510. The data may include, for example, software, sensor data, and input data or output data for instructions related thereto. The memory 514 may include a volatile memory or a non-volatile memory (e.g., a random-access memory (RAM), a dynamic RAM (DRAM), or a static RAM (SRAM)).

The communication module 516 may support establishing a direct (e.g., wired) communication channel or a wireless communication channel between the control module 510 and another component of the wearable apparatus 100 or an external electronic device (e.g., the electronic device 210 or the other wearable apparatus 220 of FIG. 2) and performing communication via the established communication channel. The communication module 516 may include a communication circuit configured to perform a communication function. For example, the communication module 516 may receive a control signal from an electronic device (e.g., the electronic device 210) and transmit the sensor data obtained by the sensor module 520 to the electronic device. According to an embodiment, the communication module 516 may include one or more CPs (not shown) that are operable independently of the processor 512 and that support direct (e.g., wired) communication or wireless communication. According to an embodiment, the communication module 516 may include a wireless communication module (e.g., a cellular communication module, a short-range wireless communication module, or a global navigation satellite system (GNSS) communication module) and/or a wired communication module. A corresponding one of these communication modules may communicate with another component of the wearable apparatus 100 and/or an external electronic device via a short-range communication network, such as Bluetooth™, wireless-fidelity (Wi-Fi), or infrared data association (IrDA)), or a long-range communication network, such as a legacy cellular network, a 5G network, a next-generation communication network, the Internet, or a computer network (e.g., a LAN or a wide area network (WAN)).

In an embodiment, each of the control systems 500 and 500-1 may further include a haptic module (not shown). The haptic module may provide haptic feedback to the user under the control of the processor 512. The haptic module may convert an electric signal into a mechanical stimulus (e.g., a vibration or a movement) or an electrical stimulus which may be recognized by a user via his or her tactile sensation or kinesthetic sensation. The haptic module may include a motor, a piezoelectric element, or an electrical stimulation device. In an embodiment, the haptic module may be positioned in at least one of the base body (e.g., the base body 80), the first thigh fastening portion 2, or the second thigh fastening portion 1.

Figure 6:
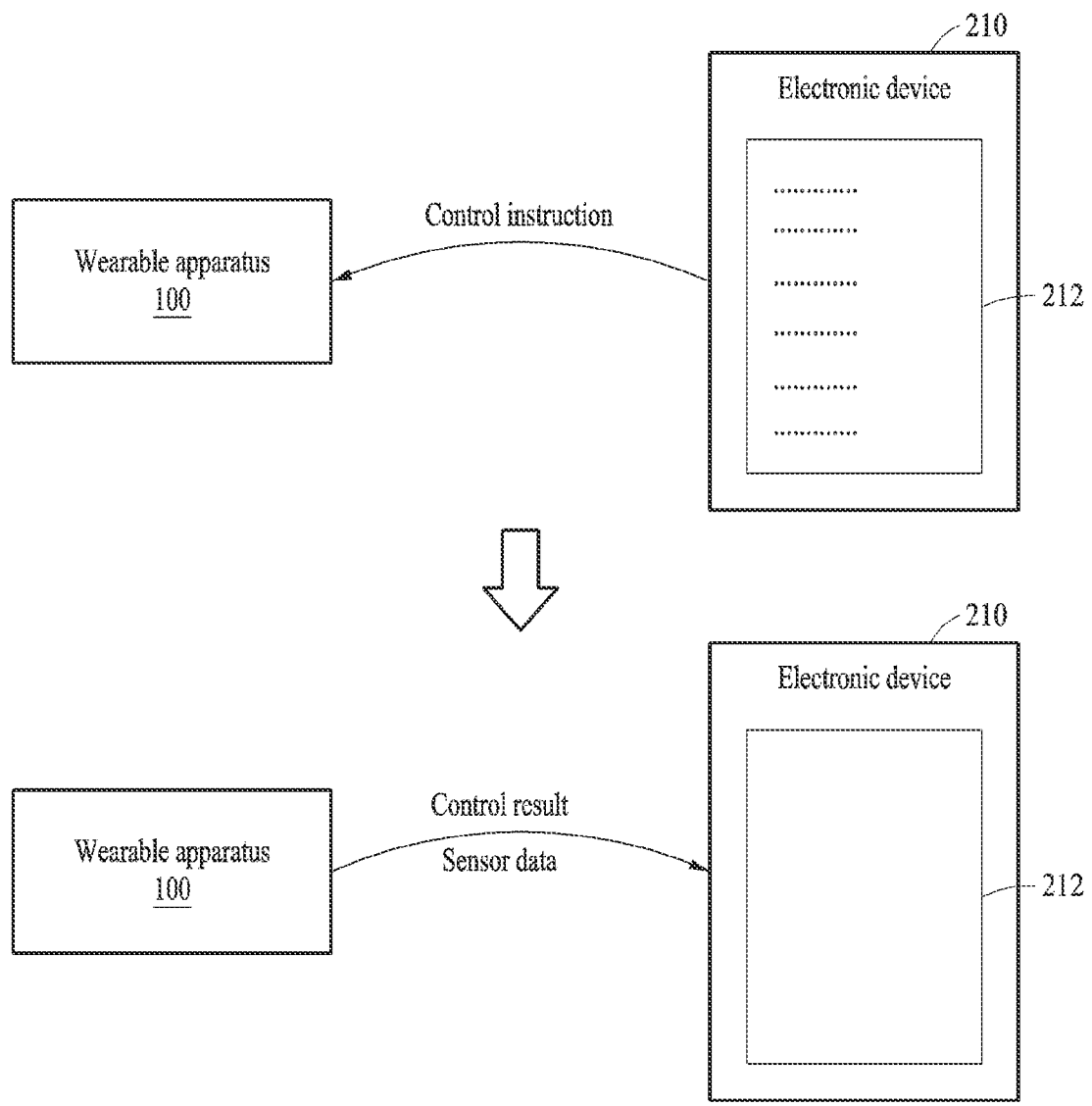
FIG. 6 is a diagram illustrating an interaction between a wearable apparatus and an electronic device according to an example embodiment.

FIG. 6 is a diagram illustrating an interaction between a wearable apparatus and an electronic device according to an embodiment.

Referring to FIG. 6, the wearable apparatus 100 may communicate with the electronic device 210. For example, the electronic device 210 may be a user terminal of a user using the wearable apparatus 100 or a controller device dedicated to the wearable apparatus 100. In an embodiment, the wearable apparatus 100 and the electronic device 210 may be connected to each other through short-range wireless communication (e.g., Bluetooth™ or Wi-Fi communication).

In an embodiment, the electronic device 210 may verify a state of the wearable apparatus 100 or execute an application to control or operate the wearable apparatus 100. A screen of a user interface (UI) may be displayed to control an operation of the wearable apparatus 100 or determine an operation mode of the wearable apparatus 100 on a display 212 of the electronic device 210 through the execution of the application. The UI may be, for example, a GUI.

In an embodiment, the user may input an instruction for controlling the operation of the wearable apparatus 100 (e.g., an execution instruction to a walking assistance mode, an exercise assistance mode, or a physical ability measurement mode) or change settings of the wearable apparatus 100 through a GUI screen on the display 212 of the electronic device 210. The electronic device 210 may generate a control instruction (or control signal) corresponding to an operation control instruction or a setting change instruction input by the user and transmit the generated control instruction to the wearable apparatus 100. The wearable apparatus 100 may operate according to the received control instruction and transmit a control result according to the control instruction and/or sensor data measured by the sensor module of the wearable apparatus 100 to the electronic device 210. The electronic device 210 may provide the user with result information (e.g., walking ability information, exercise ability information, or exercise posture evaluation information) derived by analyzing the control result and/or the sensor data through the GUI screen.

Figure 7:
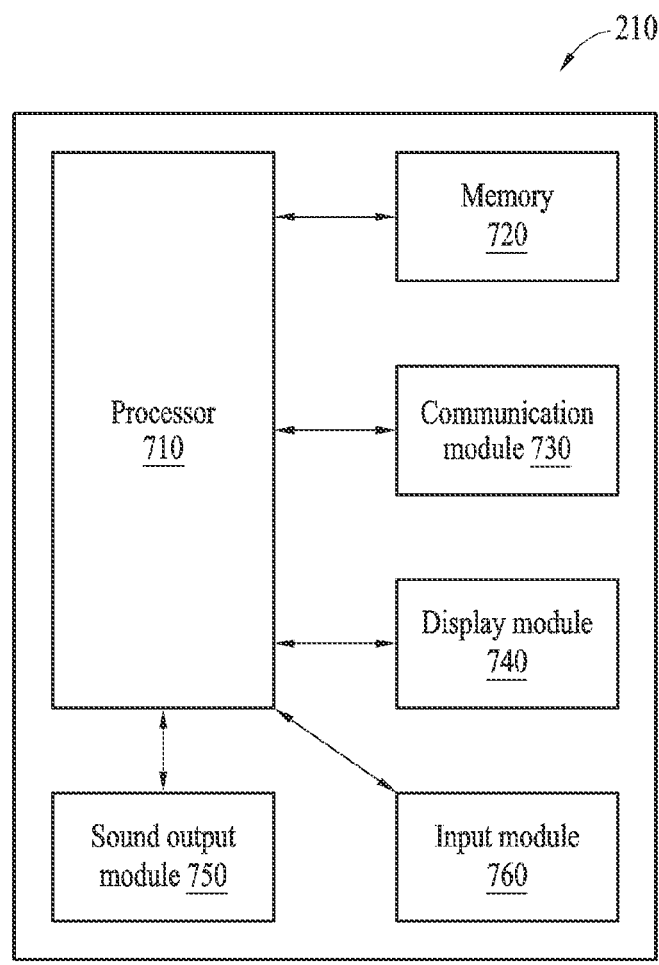
FIG. 7 is a diagram illustrating a configuration of an electronic device according to an example embodiment.

FIG. 7 is a diagram illustrating a configuration of an electronic device according to an embodiment.

Referring to FIG. 7, the electronic device 210 may include a processor 710, a memory 720, a communication module 730, a display module 740, a sound output module 750, and an input module 760. In an embodiment, at least one (e.g., the sound output module 750) of these components may be omitted from the electronic device 210, or one or more other components (e.g., a sensor module and a battery) may be added to the electronic device 210.

The processor 710 may control at least one other component (e.g., a hardware or software component) of the electronic device 210, and may perform a variety of data processing or computation. According to an embodiment, as at least part of data processing or computation, the processor 710 may store instructions or data received from another component (e.g., the communication module 730) in the memory 720, process the instructions or data stored in the memory 720, and store result data in the memory 720.

In an embodiment, the processor 710 may include a main processor (e.g., a CPU or an AP) or an auxiliary processor (e.g., a GPU, an NPU, an ISP, a sensor hub processor, or a CP) that is operable independently of or in conjunction with the main processor.

The memory 720 may store a variety of data used by at least one component (e.g., the processor 710 or the communication module 730) of the electronic device 210. The data may include, for example, a program (e.g., an application) and input data or output data for instructions related thereto. The memory 720 may include at least one instruction executable by the processor 710. The memory 720 may include a volatile memory or a non-volatile memory.

The communication module 730 may support establishing a direct (e.g., wired) communication channel or a wireless communication channel between the electronic device 210 and another electronic device (e.g., the wearable apparatus 100, the other wearable apparatus 220, or the server 230) and performing communication via the established communication channel. The communication module 730 may include a communication circuit configured to perform a communication function. The communication module 730 may include one or more CPs that are operable independently of the processor 710 (e.g., an AP) and that support a direct (e.g., wired) communication or a wireless communication. According to an embodiment, the communication module 730 may include a wireless communication module configured to perform wireless communication (e.g., a Bluetooth communication module, a cellular communication module, a Wi-Fi communication module, or a GNSS communication module) or a wired communication module (e.g., a LAN communication module or a PLC module). For example, the communication module 730, comprising communication circuitry, may transmit a control instruction to the wearable apparatus 100 and receive, from the wearable apparatus 100, at least one of sensor data including body motion information of the user who is wearing the wearable apparatus 100, state data of the wearable apparatus 100, or control result data corresponding to the control instruction.

The display module 740 may visually provide information to the outside (e.g., the user) of the electronic device 210. The display module 740 may include, for example, a liquid-crystal display (LCD) or organic light-emitting diode (OLED) display, a hologram device, or a projector device. The display module 740 may further include a control circuit configured to control the driving of a display. According to an embodiment, the display module 740 may further include a touch sensor configured to sense a touch or a pressure sensor configured to measure the intensity of a force generated by the touch.

The sound output module 750 may output a sound signal to the outside of the electronic device 210. The sound output module 750 may include a speaker configured to play back a guiding sound signal (e.g., an operation start sound or an operation error alarm), music content, or a guiding voice based on the state of the wearable apparatus 100. When it is determined that the wearable apparatus 100 is not properly worn on the body of the user, the sound output module 750 may output a guiding voice for informing the user is wearing the wearable apparatus 100 abnormally or for guiding the user to wear the wearable apparatus 100 normally.

The sound output module 750 may output, for example, a guiding voice corresponding to exercise evaluation information or exercise result information obtained by evaluating an exercise of the user.

The input module 760 may receive a command or data to be used by a component (e.g., the processor 710) of the electronic device 210, from the outside (e.g., the user) of the electronic device 210. The input module 760 may include an input component circuit and may receive a user input. The input module 760 may include, for example, a key (e.g., a button) or a touch screen.

Figure 8:
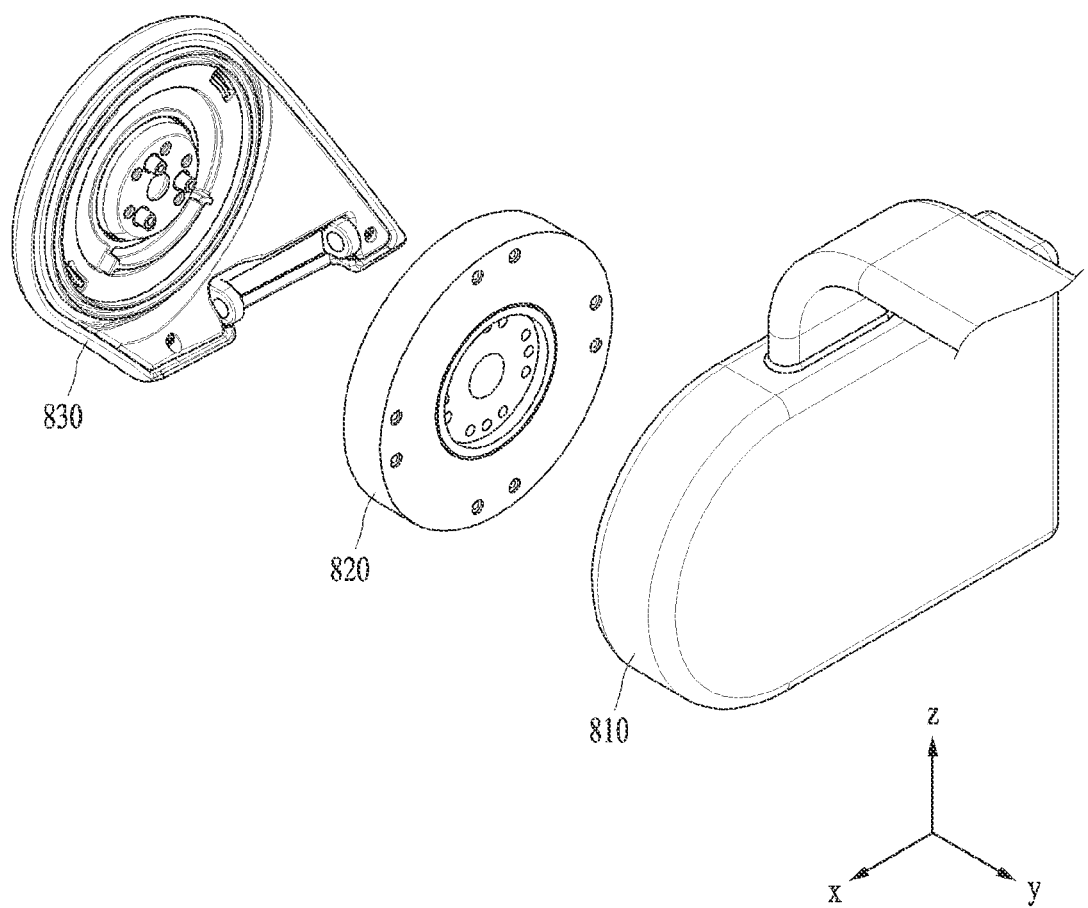
FIGS. 8 to 10 are views illustrating an example of a driving module, a torque sensor, and an output link of a wearable apparatus according to an example embodiment.
Figure 9:
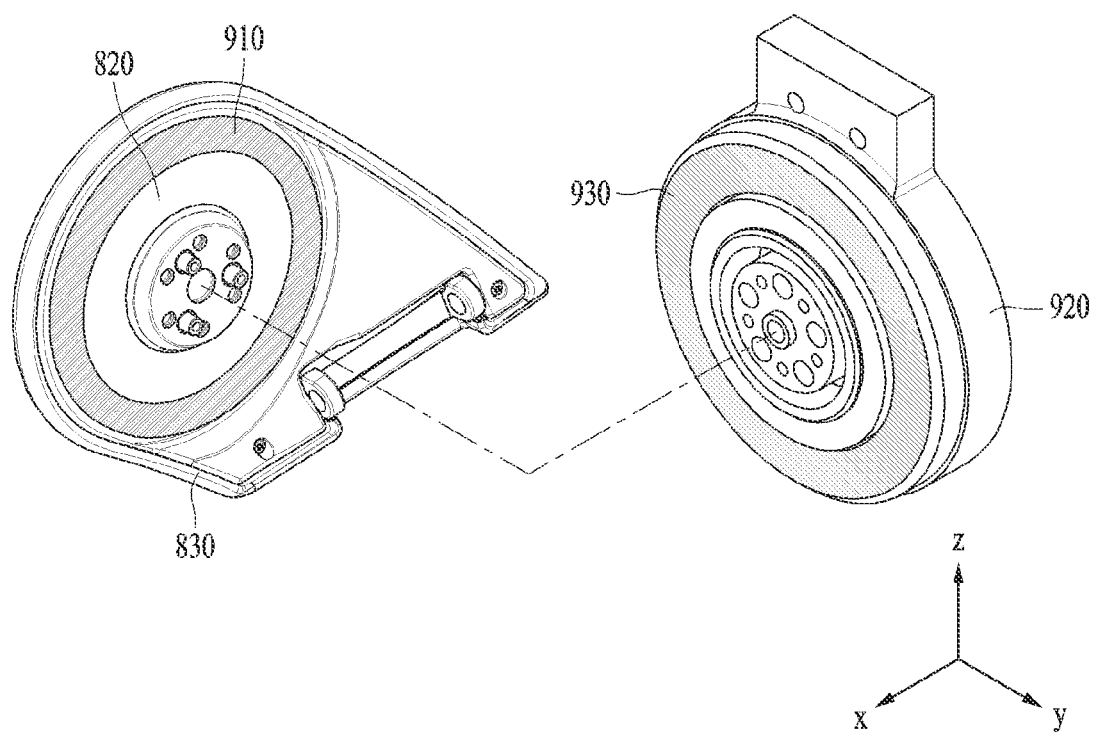
Figure 10:
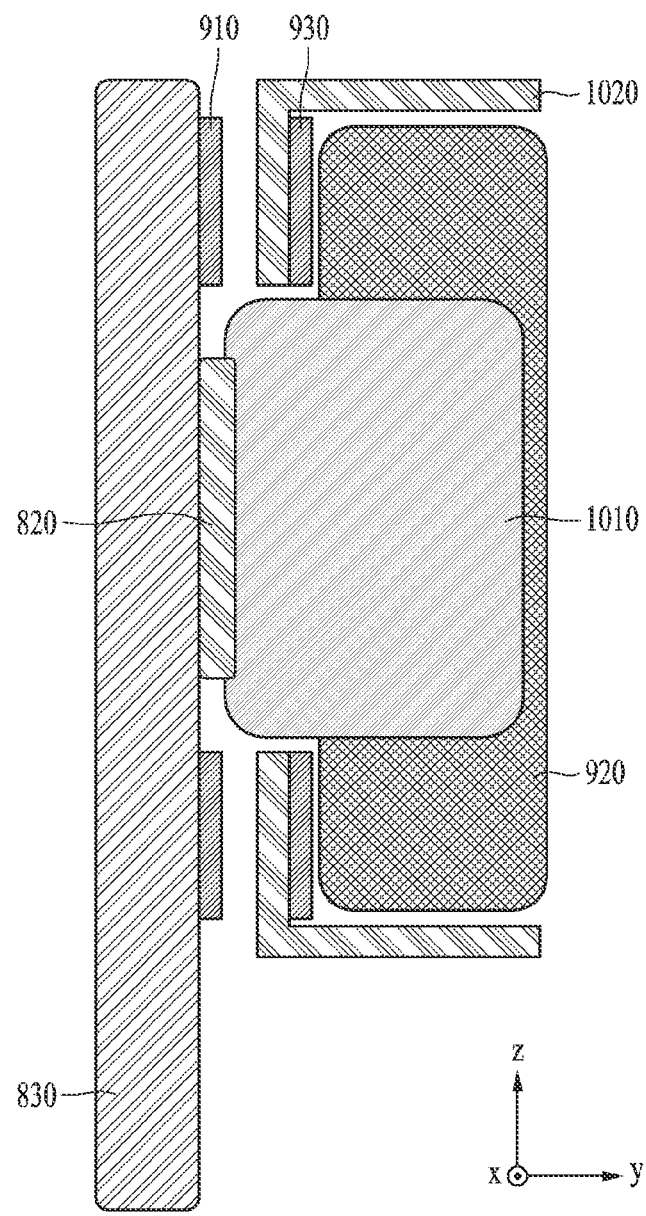

FIGS. 8 to 10 are views illustrating an example of a driving module, a torque sensor, and an output link of a wearable apparatus according to an embodiment.

Referring to FIG. 8, an example of a driving module 810, a torque sensor module 820, and an output link 830 is shown.

The driving module 810 may be an example of each of the first driving module 45 and the second driving module 35 of FIG. 3.

The torque sensor module 820 may be an example of each of the first torque sensor module and the second torque sensor module described with reference to FIG. 3. The description of the torque sensor module 820 may apply to each of the first torque sensor module and the second torque sensor module.

The output link 830 may be an example of each of the first output link and the second output link described with reference to FIG. 3. The description of the output link 830 may apply to each of the first output link and the second output link.

In an embodiment, the torque sensor module 820 may generate torque data by measuring a torque generated by at least one of a motion of the user or an operation of the driving module 810. For example, the wearable apparatus 100 may provide the user who is wearing the wearable apparatus 100 with the power (or an external force) (e.g., assistance force or resistance force) generated by the driving module 810. A torque may be generated by the operation of the driving module 810. Further, the user may move in a situation where power is provided to the user, and a torque may be generated by the motion (e.g., rotation of the hip joints) of the user. The torque generated by the driving module 810 and/or the torque generated by the motion of the user may generate strain on a rotation axis of the torque sensor module 820 (or a motor). The torque sensor module 820 may generate torque data by detecting or measuring the generated strain.

In an embodiment, the torque sensor module 820 may be included in the output link 830. The torque sensor module 820 may be integrated (or unified) with the output link 830.

In an embodiment, one end portion of the output link 830 may be connected to the driving module 810, and the other end portion of the output link 830 may be connected to a support frame (e.g., the leg support frame 50 or the leg support frame 55 of FIG. 3). The support frame connected to the output link 830 may receive the power generated by the driving module 810 through the output link 830 and provide the received power to the body (e.g., the thighs) of the user.

In an embodiment, the wearable apparatus 100 may include a wireless power transmitter (not shown) and a wireless power receiver (not shown). The wireless power transmitter may transmit wireless power to the wireless power receiver. The wireless power receiver may convert (e.g., rectify and/or step down) the received wireless power and supply the converted wireless power to the torque sensor module 820.

In an embodiment, at least a portion (e.g., a receive (RX) integrated circuit (IC) and a direct current (DC)-DC converter) of the wireless power receiver may be positioned in a body of the output link 830. The remaining portion (e.g., a reception coil) of the wireless power receiver may be positioned on a first surface of the output link 830. For example, in the example shown in FIGS. 9 and 10, a reception coil 910 of the wireless power receiver may be positioned on the first surface of the output link 830.

In the example of FIGS. 9 and 10, a motor 920 (e.g., the motor 534 or the motor 534-1 of FIG. 5B) of the driving module (e.g., see 810 in FIG. 8) and a transmission coil 930 of the wireless power transmitter may be positioned in a housing 1020 (or an injection member). Another component (e.g., a transmit (TX) IC) of the wireless power transmitter may be further positioned in the housing. The wireless power transmitter, the motor 920, and the like positioned in the housing may be waterproofed by the housing. In some embodiments, the transmission coil 930 may be positioned outside the housing 1020.

In an embodiment, when the torque sensor module 820 (or the output link 830) is connected, directly or indirectly, to the driving module 810, the transmission coil 930 and the reception coil 910 may face each other. Unless the torque sensor module 820 (or the output link 830) is separated from the driving module 810, the alignment between the transmission coil 930 and the reception coil 910 may be maintained.

In an embodiment, the torque sensor module 820 (or the output link 830) may be connected, directly or indirectly, to a gear 1010. The gear 1010 may convert (e.g., reduce) an output torque of the motor 920. The output link 830 may rotate by the converted output torque. The alignment between the reception coil 910 and the transmission coil 930 may be maintained even when the output link 830 rotates. When alternating current flows through the transmission coil 930, the transmission coil 930 may generate an electromagnetic field. An induced electromotive force may be generated in the reception coil 910 by the electromagnetic field. Accordingly, the transmission coil 930 may transmit wireless power to the reception coil 910.

In the example shown in FIGS. 9 and 10, the reception coil 910 is illustrated as being positioned outside the output link 830, but this is merely an example, and the reception coil 910 may be positioned in the body of the output link 830.

According to an embodiment, the torque sensor module 820 may receive power wirelessly and transmit torque data wirelessly. The wearable apparatus 100 may not include a wire used to transmit and receive the torque data, a power cable used to supply power to the torque sensor module 820, and a connector, thereby achieving reduction in size and weight.

FIGS. 11 to 13B are block diagrams illustrating an example of a configuration of a wearable apparatus according to an embodiment.

Figure 11:
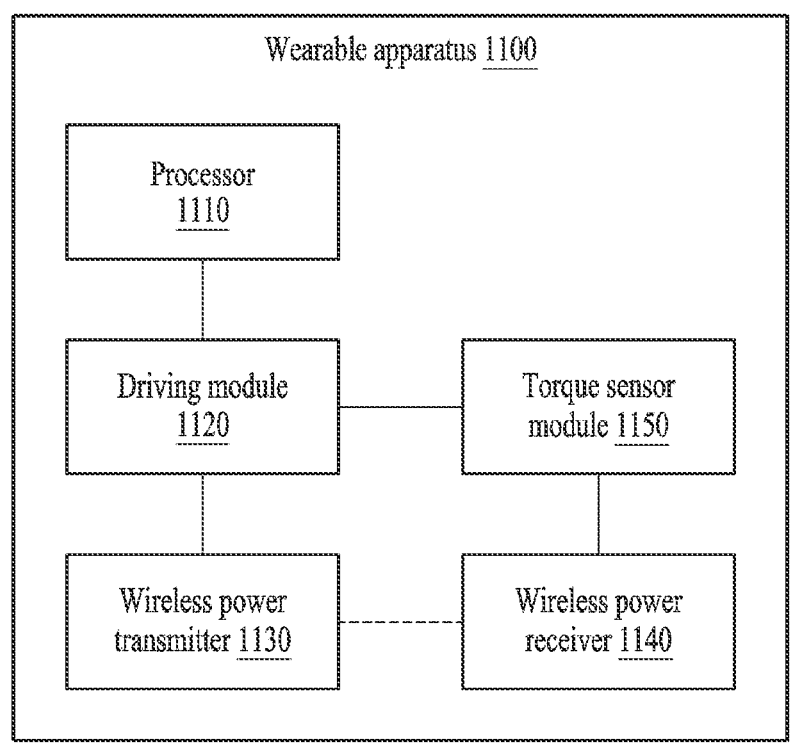
FIGS. 11, 12, and 13A-13B are block diagrams illustrating an example of a configuration of a wearable apparatus according to an example embodiment.

Referring to FIG. 11, a wearable apparatus 1100 (e.g., the wearable apparatus 100) may include a processor 1110 (e.g., the processor 512), a driving module 1120 (e.g., the driving module 810), a wireless power transmitter 1130, a wireless power receiver 1140, and a torque sensor module 1150 (e.g., the torque sensor module 820). Transmitter 1130 and receiver 1140 may be separate elements, or may be part of the same transceiver, in various example embodiments.

The driving module 1120 may be an example of each of the first driving module 45 and the second driving module 35 of FIG. 3. The description of the driving module 1120 may apply to each of the first driving module 45 and the second driving module 35.

The wireless power transmitter 1130 may be an example of each of the first wireless power transmitter and the second wireless power transmitter described with reference to FIG. 3. The description of the wireless power transmitter 1130 may apply to each of the first wireless power transmitter and the second wireless power transmitter.

The wireless power receiver 1140 may be an example of each of the first wireless power receiver and the second wireless power receiver described with reference to FIG. 3. The description of the wireless power receiver 1140 may apply to each of the first wireless power receiver and the second wireless power receiver.

The torque sensor module 1150 may be an example of each of the first torque sensor module and the second torque sensor module described with reference to FIG. 3. The description of the torque sensor module 1150 may apply to each of the first torque sensor module and the second torque sensor module.

In an embodiment, the driving module 1120 may generate power (or an external force) to be applied to the user.

In an embodiment, the torque sensor module 1150 may generate torque data by measuring a torque generated by at least one of an operation of the driving module 1120 or a motion of a user. For example, when the user moves in a situation where the wearable apparatus 1100 applies power to the user, a measured value of the torque generated by the operation (or rotation) of the driving module 1120 and a measured value of the torque generated by the motion of the user may be included (or mixed) in the torque data generated by the torque sensor module 1150.

In an embodiment, the wireless power transmitter 1130 may communicate with the driving module 1120 and/or the processor 1110.

In an embodiment, the wireless power transmitter 1130 may perform wireless power transmission. The wireless power transmitter 1130 may transmit wireless power to the wireless power receiver 1140.

In an embodiment, the wireless power receiver 1140 may receive wireless power from the wireless power transmitter 1130. The wireless power receiver 1140 may convert the received wireless power and supply the converted wireless power to the torque sensor module 1150.

In an embodiment, the wireless power receiver 1140 may receive torque data from the torque sensor module 1150 and transmit the torque data to the wireless power transmitter 1130.

In an embodiment, the wireless power transmitter 1130 and the wireless power receiver 1140 may operate according to a wireless charging standard (e.g., the Qi standard). According to the Qi standard, the wireless power transmitter 1130 may transmit wireless power to the wireless power receiver 1140. According to the Qi standard, for example, the wireless power transmitter 1130 and the wireless power receiver 1140 may exchange data. The wireless charging standard is not limited to the Qi standard mentioned above.

In an embodiment, the wireless power transmitter 1130 and the wireless power receiver 1140 may not perform some of the operations according to the Qi standard. Within the wearable apparatus 1100, the wireless power receiver 1140 may maintain a predetermined distance from the wireless power transmitter 1130. In other words, the distance between a transmission coil 1132 and a reception coil 1141 may be maintained constant. The wireless power transmitter 1130 may not perform, for example, an RX detection operation according to the Qi standard. The wireless power transmitter 1130 and/or the wireless power receiver 1140 may not perform, for example, a foreign object detection (FOD) operation according to the Qi standard. The wireless power transmitter 1130 may not perform, for example, an operation of identifying the wireless power receiver 1140. The wireless power receiver 1140 may not transmit, for example, information about the strength of a signal (e.g., a ping signal, etc.) transmitted from the wireless power transmitter 1130 to the wireless power transmitter 1130. As will be described later, an output voltage of the wireless power receiver 1140 may be, for example, a first voltage (e.g., 5 volts (V)). The wireless power transmitter 1130 and/or the wireless power receiver 1140 may not perform, for example, an operation of adjusting the output voltage of the wireless power receiver 1140. Some of the operations described as not being performed are examples, and depending on the implementation, at least one or all of the operations described as not being performed may be performed.

The processor 1110 may control the overall operation of the wearable apparatus 1100.

In an embodiment, the processor 1110 may communicate with the driving module 1120. The processor 1110 may receive torque data from the wireless power transmitter 1130 through the driving module 1120. The wireless power transmitter 1130 may transmit the torque data to the driving module 1120, and the driving module 1120 may transmit the torque data to the processor 1110. Embodiments are not limited thereto, and the processor 1110 may receive the torque data from the wireless power transmitter 1130 by directly communicating with the wireless power transmitter 1130.

In an embodiment, the processor 1110 may generate a control signal for generating a torque of the driving module 1120 based on the torque data and motion information (e.g., a joint angle value) of the user. The processor 1110 may control the driving module 1120 based on the generated control signal. Accordingly, the processor 1110 may allow an external force optimized for the user to be provided.

In an embodiment, when the user performs a motion with a suitable force in a situation where the wearable apparatus 1100 is providing an external force (e.g., an assistance force or resistive force) to the user, the difference between the value of the torque data obtained by the torque sensor module 1150 and the value of the torque generated by the driving module 1120 may be within a predetermined level. In some cases, the user may perform a motion with an insufficient force at a predetermined joint angle value. A motion by an insufficient force may interfere with the operation of the driving module 1120, and thus, the value of the torque data obtained by the torque sensor module 1150 may be different from the value of the torque generated by the driving module 1120 by more than the predetermined level. In this case, the processor 1110 may recognize that a stronger external force is to be provided to the user at the predetermined joint angle value of the user. The processor 1110 may generate a control signal based on the torque data and the motion information of the user so that a stronger external force may be provided to the user at the predetermined joint angle value of the user. For example, when the user goes uphill or goes up the stairs, the value of the torque data obtained by the torque sensor module 1150 may be different from the value of the torque generated by the driving module 1120 by more than the predetermined level. In this case, the processor 1110 may generate a control signal based on the torque data and the motion information of the user so that a stronger external force may be provided to the user. The processor 1110 may control the driving module 1120 based on the generated control signal. The driving module 1120 may provide a stronger external force to the user at the predetermined joint angle value. The processor 1110 may allow an external force optimized for the user to be provided.

Figure 12:
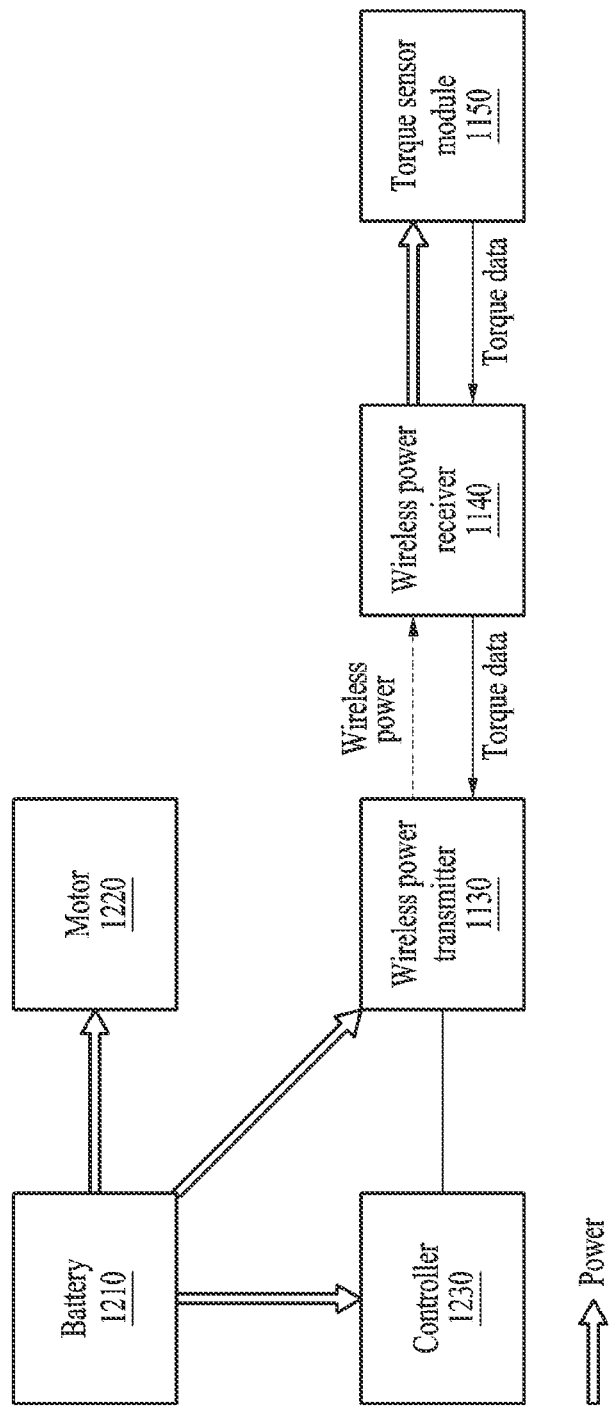
Figure 13A:
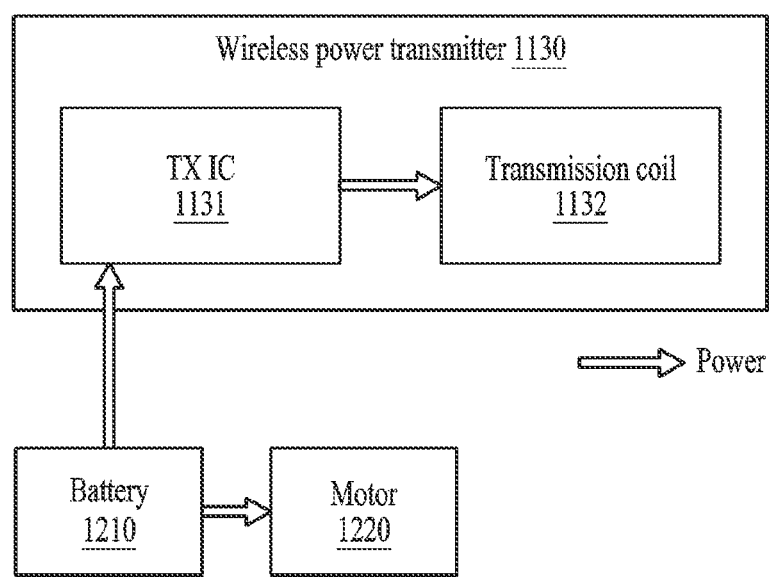
Figure 13B:
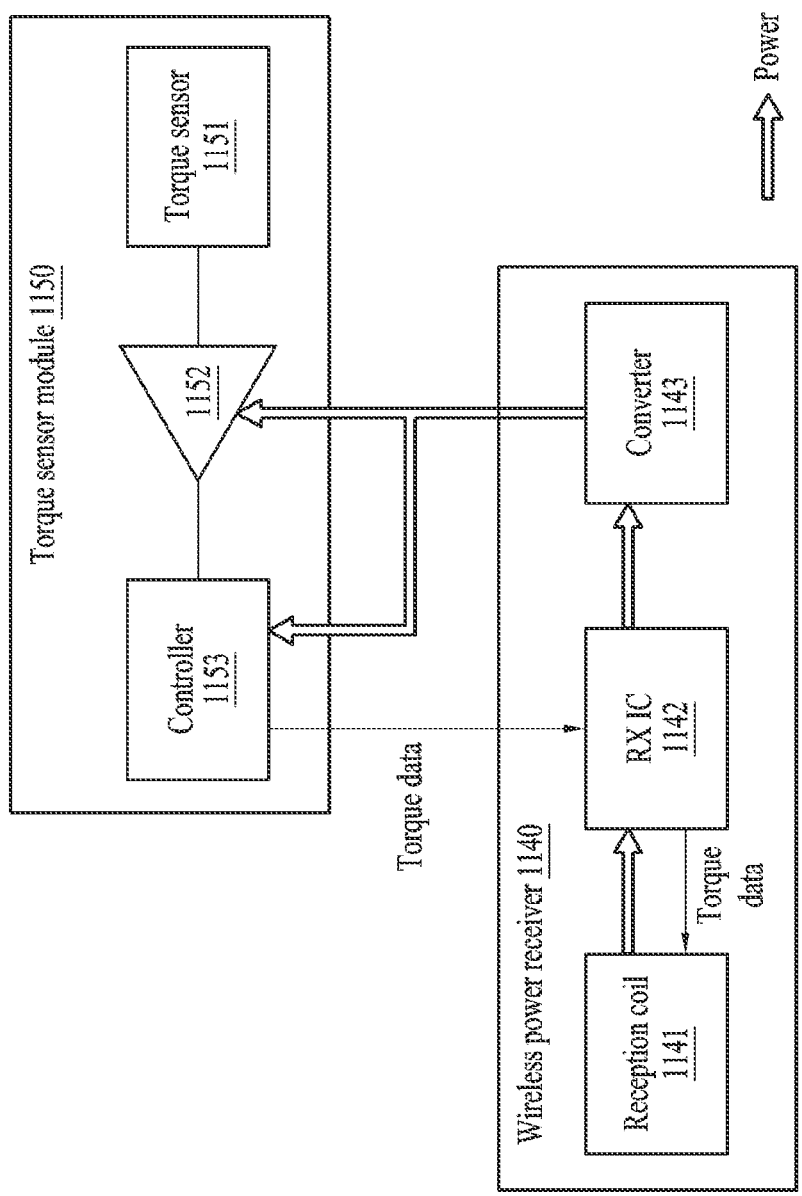

In an embodiment, referring to FIG. 12, the wearable apparatus 1100 may include a battery 1210, and the driving module 1120 may include, for example, a motor 1220 and a controller 1230 (e.g., an MCU). It is described above the controller 1230 is included in the driving module 1120, but this is merely an example, and the controller 1230 may not be included in the driving module 1120. The controller 1230 and the driving module 1120 may be positioned in the same housing (e.g., the housing 1020 of FIG. 10). Referring to FIG. 13A, the wireless power transmitter 1130 may include, for example, a TX IC 1131 and a transmission coil 1132 (e.g., the transmission coil 930). Referring to FIG. 13B, the wireless power receiver 1140 may include a reception coil 1141 (e.g., the reception coil 910), an RX IC 1142, and a converter 1143 (e.g., a DC-DC converter). Depending on the implementation, the converter 1143 may be included in the RX IC 1142.

In an embodiment, when the wearable apparatus 1100 is powered on, the processor 1110 may start communication with the controller 1230. The communication between the processor 1110 and the controller 1230 may be performed by, for example, an RS-232 communication method, but is not limited thereto. The controller 1230 may start communication with the TX IC 1131. The communication between the controller 1230 and the TX IC 1131 may be performed by, for example, an Inter-Integrated Circuit (I²C) method, but is not limited thereto. The controller 1230 may initialize (or enable) the TX IC 1131.

In an embodiment, the battery 1210 may provide DC power to the motor 1220 (e.g., the motor 534 or the motor 534-1), the controller 1230, and the wireless power transmitter 1130. Although not shown in FIG. 12, the wearable apparatus 1100 may include a power management integrated circuit (PMIC), and the PMIC may convert the power of the battery 1210 into power (or voltage) suitable for each of the motor 1220, the controller 1230, and the wireless power transmitter 1130 and supply the converted power thereto.

In an embodiment, the TX IC 1131 may start wireless communication with the RX IC 1142. The wireless communication between the TX IC 1131 and the RX IC 1142 may be performed by, for example, a wireless communication method according to the Qi standard, but is not limited thereto. The TX IC 1131 and the RX IC 1142 may perform a handshake operation. For example, according to the Qi standard, the TX IC 1131 and the RX IC 1142 may perform a handshake operation for wireless charging.

In an embodiment, the TX IC 1131 may receive DC power from the battery 1210 (or the PMIC).

In an embodiment, the TX IC 1131 may convert the received DC power into alternating current (AC) power. The TX IC 1131 may transmit the AC power to the transmission coil 1132. As current flows through the transmission coil 1132, an electromagnetic field may be generated in the transmission coil 1132.

In an embodiment, AC power (or alternating current) may be generated in the reception coil 1141 of FIG. 13B by the electromagnetic field generated by the transmission coil 1132.

In an embodiment, the RX IC 1142 and the converter 1143 may convert the AC power into DC power suitable for the torque sensor module 1150.

For example, the RX IC 1142 may receive the AC power from the reception coil 1141 and rectify the AC power into DC power. The converter 1143 may receive the DC power from the RX IC 1142 and step the voltage (e.g., 9V, 12V, or 15V) of the received DC power down to a voltage (e.g., 5V) suitable for the torque sensor module 1150.

In an embodiment, the converter 1143 may supply the converted DC power (e.g., the stepped-down DC power) to the torque sensor module 1150.

In an embodiment, the torque sensor module 1150 may include, for example, a torque sensor 1151 (or a strain sensor), an amplifier 1152, and a controller 1153. The amplifier 1152 and the controller 1153 may receive the converted DC power from the converter 1143.

In an embodiment, the torque sensor 1151 may include a strain gauge. Strain may be generated on a rotation axis by a torque generated by at least one of an operation of the driving module 1120 or a motion of the user, and the torque sensor 1151 may output an electrical signal (e.g., a voltage signal or current signal) based on the strain.

In an embodiment, the amplifier 1152 may amplify the electrical signal output by the torque sensor 1151 and denoise the amplified electrical signal. The amplifier 1152 may output the denoised amplified electrical signal to the controller 1153.

In an embodiment, the controller 1153 may include an analog-to-digital converter (ADC).

Depending on the implementation, the torque sensor module 1150 may correspond to an integrated torque sensor in which a strain gauge, a microelectromechanical system (MEMS) sensor, the amplifier 1152, and the controller 1153 are integrated.

In an embodiment, the controller 1153 may convert an output signal (e.g., the denoised amplified electrical signal) from the amplifier 1152 into a digital signal using the ADC. The converted digital signal may correspond to the torque data described above. The controller 1153 may transmit the torque data to the RX IC 1142. The communication between the controller 1153 and the RX IC 1142 may be performed by, for example, an I²C method, but is not limited thereto.

In an embodiment, the RX IC 1142 may transmit the torque data to the wireless power transmitter 1130 through the reception coil 1141. For example, the RX IC 1142 may modulate the torque data according to a modulation method and transmit the modulated torque data to the wireless power transmitter 1130 through the reception coil 1141. The modulation method may include, for example, a frequency shift keying (FSK) modulation method, a Manchester coding modulation method, a phase shift keying (PSK) modulation method, a pulse width modulation method, and a differential bi-phase modulation method, but is not limited thereto.

In an embodiment, the TX IC 1131 of the wireless power transmitter 1130 may receive the torque data from the wireless power receiver 1140 through the transmission coil 1132. For example, the TX IC 1131 may receive the modulated torque data from the wireless power receiver 1140 through the transmission coil 1132 and demodulate the modulated torque data. The TX IC 1131 may transmit the torque data to the controller 1230, and the controller 1230 may transmit the torque data to the processor 1110. The TX IC 1131 may transmit the torque data to the processor 1110 through the controller 1230.

In an embodiment, an output link (e.g., the output link 830 of FIG. 8) may be rotated by the driving module 1120. The wireless power receiver 1140 and the torque sensor module 1150 of FIG. 11 may be positioned in the output link. In some embodiments, the torque sensor module 1150 and the output link may be integrated.

In an embodiment, a wearing detection sensor (not shown) configured to detect whether the user is wearing the wearable apparatus may be positioned in the output link. The converter 1143 may supply the converted DC power to the wearing detection sensor. The wearing detection sensor may transmit a wearing detection result to the RX IC 1142. The RX IC 1142 may transmit the wearing detection result to the wireless power transmitter 1130 through the reception coil 1141. The TX IC 1131 may receive the wearing detection result from the wireless power receiver 1140 and transmit the wearing detection result to the processor 1110 through the controller 1230. The processor 1110 may determine whether the user is wearing the wearable apparatus 1100 based on the wearing detection result.

The description of the embodiments described with reference to FIGS. 1 to 10 may apply to the embodiments described with reference to FIGS. 11 to 13B.

FIGS. 14 to 16B are block diagrams illustrating another example of a configuration of a wearable apparatus according to an embodiment.

Figure 14:
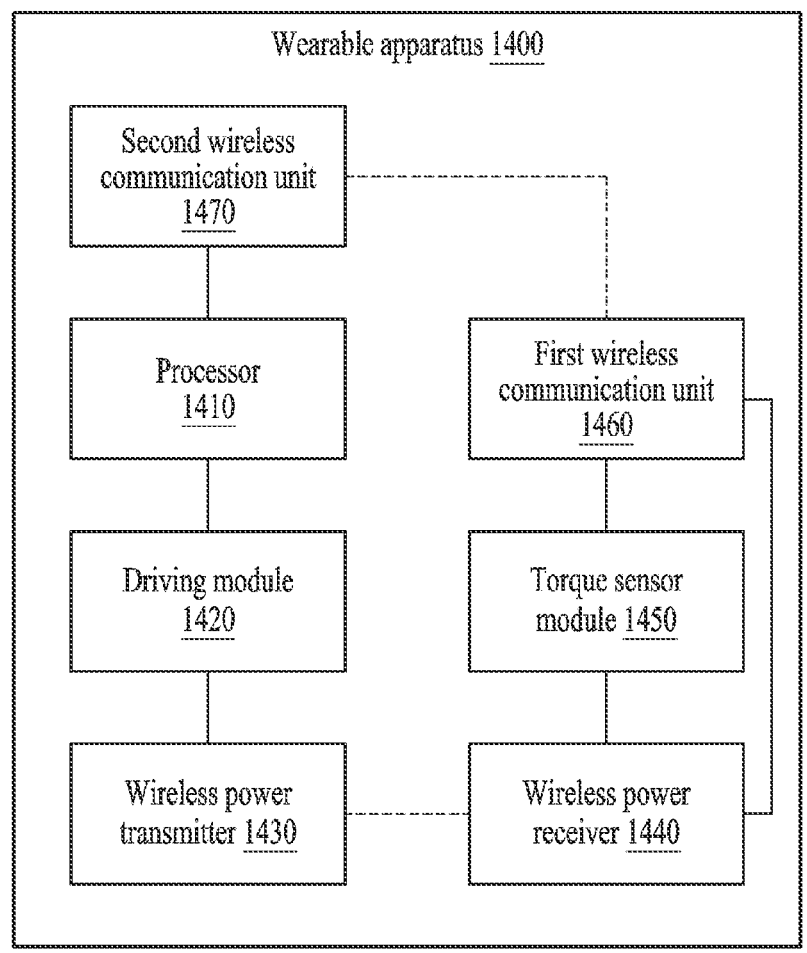
FIGS. 14, 15, and 16A-16B are block diagrams illustrating another example of a configuration of a wearable apparatus according to an example embodiment.

Referring to FIG. 14, a wearable apparatus 1400 (e.g., the wearable apparatus 100) may include a processor 1410 (e.g., the processor 512), a driving module 1420 (e.g., the driving module 810), a wireless power transmitter 1430 (e.g., the wireless power transmitter 1130), a wireless power receiver 1440 (e.g., the wireless power receiver 1140), a torque sensor module 1450 (e.g., the torque sensor module 820 or the torque sensor module 1150), a first wireless communication unit 1460, and a second wireless communication unit 1470. The first wireless communication unit 1460 and/or the second wireless communication unit 1470 may be included in the communication module 516.

The description of each of the processor 1110, the driving module 1120, the wireless power transmitter 1130, the wireless power receiver 1140, and the torque sensor module 1150 described above may apply to each of the processor 1410, the driving module 1420, the wireless power transmitter 1430, the wireless power receiver 1440, and the torque sensor module 1450 of FIG. 14.

In an embodiment, the driving module 1420 may generate power (or a torque) to be applied to a user.

In an embodiment, the torque sensor module 1450 may generate torque data by measuring a torque generated by at least one of an operation of the driving module 1420 or a motion of the user.

In an embodiment, the wireless power transmitter 1430 may communicate with the driving module 1420 and/or the processor 1410.

In an embodiment, the wireless power transmitter 1430 may perform wireless power transmission. The wireless power transmitter 1430 may transmit wireless power to the wireless power receiver 1440.

In an embodiment, the wireless power receiver 1440 may receive wireless power from the wireless power transmitter 1430. The wireless power receiver 1440 may convert the received wireless power and supply the converted wireless power to the torque sensor module 1450.

In an embodiment, the first wireless communication unit 1460 may form a wireless communication link with the second wireless communication unit 1470. The first wireless communication unit 1460 and the second wireless communication unit 1470 may each include, for example, a Bluetooth module, a Bluetooth Low Energy (BLE) module, or a near-field communication (NFC) module, but are not limited thereto.

In an embodiment, the first wireless communication unit 1460 may have an embedded small battery and operate by receiving power from the small battery. Depending on the implementation, the first wireless communication unit 1460 may not contain an embedded small battery. The wireless power receiver 1440 may convert the received wireless power into wireless power suitable for the first wireless communication unit 1460 and supply the converted wireless power to the first wireless communication unit 1460.

In an embodiment, the first wireless communication unit 1460 may receive torque data from the torque sensor module 1450. The first wireless communication unit 1460 may transmit the torque data to the second wireless communication unit 1470. The processor 1410 may receive the torque data from the second wireless communication unit 1470. The processor 1410 may receive the torque data from the torque sensor module 1450 through wireless communication. The processor 1410 may generate a control signal for controlling the driving module 1420 based on the torque data and motion information (e.g., a joint angle value) of the user. The processor 1410 may control the driving module 1420 based on the generated control signal.

Figure 15:
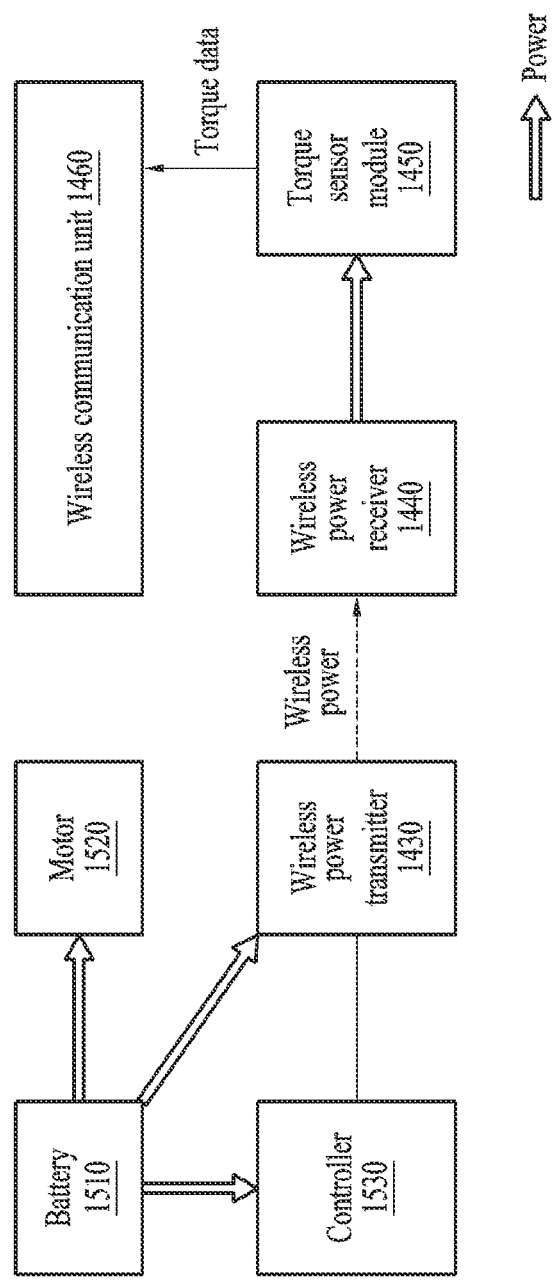
Figure 16A:
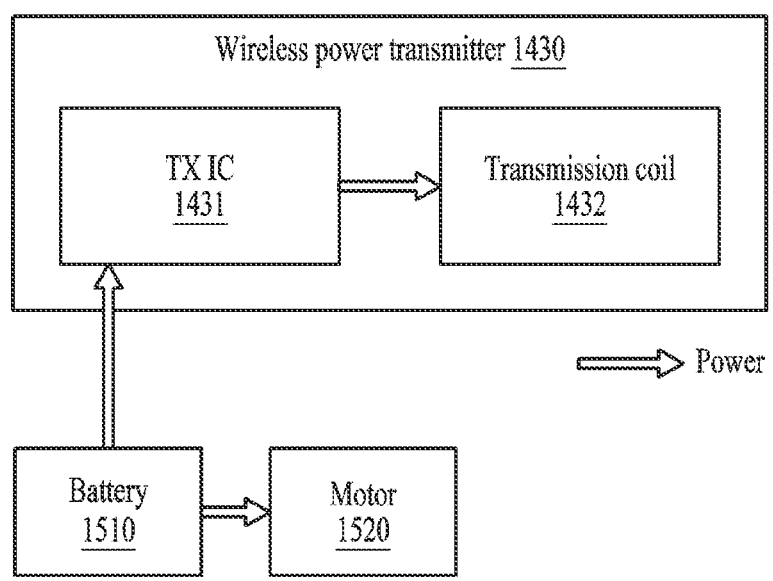
Figure 16B:
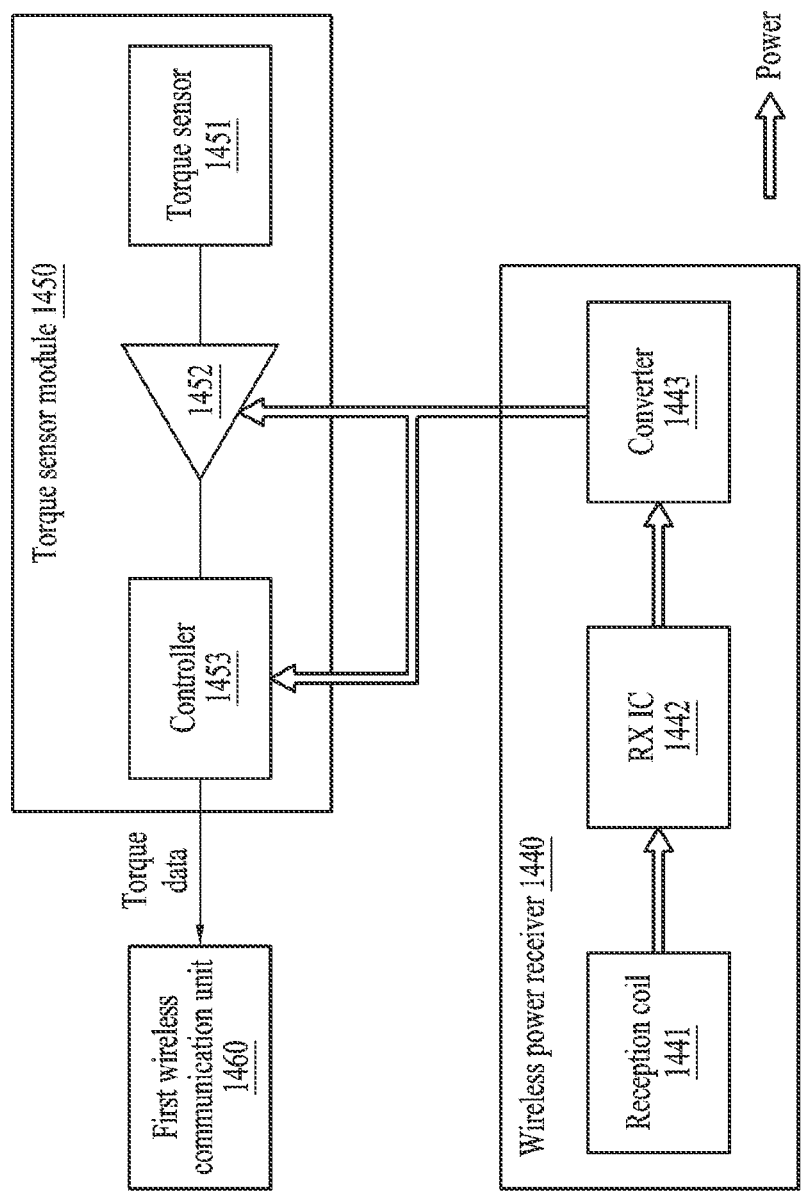

In an embodiment, referring to FIG. 15, the wearable apparatus 1400 may include a battery 1510 (e.g., the battery 1210), and the driving module 1420 may include, for example, a motor 1520 and a controller 1530 (e.g., the controller 1230 of FIG. 12). It is described above the controller 1530 is included in the driving module 1420, but this is merely an example, and the controller 1530 may not be included in the driving module 1420. The controller 1530 and the driving module 1420 may be positioned in the same housing (e.g., the housing 1020 of FIG. 10). Referring to FIG. 16A, the wireless power transmitter 1430 may include, for example, a TX IC 1431 (e.g., the TX IC 1131 of FIG. 12A) and a transmission coil 1432 (e.g., the transmission coil 1132 of FIG. 12A). Referring to FIG. 16B, the wireless power receiver 1440 may include a reception coil 1441 (e.g., the reception coil 1141 of FIG. 12B), an RX IC 1442 (e.g., the RX IC 1142 of FIG. 12B), and a converter 1443 (e.g., the converter 1143 of FIG. 12B). Depending on the implementation, the converter 1443 may be included in the RX IC 1442.

In an embodiment, the battery 1510 may supply DC power to the motor 1520, the controller 1530, and the wireless power transmitter 1430. Although not shown in FIG. 15, the wearable apparatus 1400 may include a PMIC, and the PMIC may convert the power of the battery 1510 into power (or voltage) suitable for each of the motor 1520, the controller 1530, and the wireless power transmitter 1430 and supply the converted power thereto.

In an embodiment, the TX IC 1431 may receive DC power from the battery 1510 (or the PMIC).

In an embodiment, the TX IC 1431 may convert the received DC power into AC power (e.g., see FIG. 16A). The TX IC 1431 may transmit the AC power to the transmission coil 1432. As current flows through the transmission coil 1432, an electromagnetic field may be generated in the transmission coil 1432.

In an embodiment, AC power (or alternating current) may be generated in the reception coil 1441 of FIG. 16B by the electromagnetic field generated by the transmission coil 1432. The RX IC 1442 may receive the AC power from the reception coil 1441 and rectify the AC power into DC power.

In an embodiment, the converter 1443 may receive the DC power from the RX IC 1442 and step the voltage of the received DC power down to a voltage (e.g., 5V) suitable for the torque sensor module 1450. The converter 1443 may supply the converted DC power (e.g., the stepped-down DC power) to the torque sensor module 1450.

In an embodiment, the torque sensor module 1450 may include, for example, a torque sensor 1451 (e.g., the torque sensor 1151), an amplifier 1452 (e.g., the amplifier 1152), and a controller 1453 (e.g., the controller 1153). The amplifier 1452 and the controller 1453 may receive the converted DC power from the converter 1443.

The torque sensor module 1450 may generate torque data by detecting strain generated on a rotation axis thereof. The torque data may include a measured value of a torque generated by at least one of a motion of the user or an operation of the driving module 1420. The description of the torque sensor module 1150 may apply to the torque sensor module 1450.

In an embodiment, the first wireless communication unit 1460 may receive the torque data from the torque sensor module 1450 and transmit the torque data to the second wireless communication unit 1470. The processor 1410 may receive the torque data from the second wireless communication unit 1470.

In an embodiment, the wireless power receiver 1440, the torque sensor module 1450, and the first wireless communication unit 1460 may be positioned in an output link (e.g., the output link 830 of FIG. 8). In some embodiments, the torque sensor module 1450 and the output link may be integrated.

In an embodiment, a wearing detection sensor (not shown) configured to detect whether the user is wearing the wearable apparatus may be positioned in the output link. The converter 1143 may convert the voltage of the DC power into a voltage suitable for the wearing detection sensor and supply the converted DC power to the wearing detection sensor. The wearing detection sensor may transmit a wearing detection result to the first wireless communication unit 1460. The first wireless communication unit 1460 may transmit the wearing detection result to the second wireless communication unit 1470. The processor 1410 may receive the wearing detection result from the second wireless communication unit 1470. The processor 1410 may determine whether the user is wearing the wearable apparatus 1400 based on the wearing detection result.

The description of the embodiments described with reference to FIGS. 1 to 13B may apply to the embodiments described with reference to FIGS. 14 to 16B.

According to an embodiment, a wearable apparatus 100, 1100, 1400 to be worn on a body of a user may include a driving module 530, 810, 1120, 1420 configured to generate power to be applied to the user. The wearable apparatus may include an output link 830 connected, directly or indirectly, to the driving module, wherein the output link may include a torque sensor module 820, 1150, 1450 configured to generate torque data by measuring a torque generated by at least one of an operation of the driving module and a motion of the user. The wearable apparatus may include a wireless power transmitter 1130, 1430 configured to perform wireless power transmission. The wearable apparatus may include a wireless power receiver 1140, 1440 configured to receive wireless power transmitted by the wireless power transmitter, convert the received wireless power, supply the converted wireless power to the torque sensor module, receive the torque data from the torque sensor module, and transmit the received torque data to the power transmitter. The wearable apparatus may include a processor 512, 1110, 1410 configured to receive the torque data from the wireless power transmitter through the driving module, generate a control signal for controlling the driving module based on the torque data and motion information of the user, and control the driving module based on the generated control signal. Each "module" herein may comprising circuitry.

The wearable apparatus may further include a housing 1020 including the driving module.

Each embodiment herein may be used in combination with any other embodiment(s) described herein.

A transmission coil 930, 1132, 1432 of the wireless power transmitter may be positioned inside the housing, and a reception coil 910, 1141, 1441 of the wireless power receiver may be positioned on a first surface of the output link so as to face the transmission coil.

The wearable apparatus may further include a wireless communication unit (e.g., a first wireless communication unit 1460) configured to receive the converted wireless power from the wireless power receiver, form a wireless communication link with the processor, and transmit the torque data to the processor through the formed wireless communication link.

The wireless communication unit may be positioned in the output link.

The wearable apparatus may further include a wearing detection sensor positioned in the output link and configured to detect whether the user is wearing the wearable apparatus and transmit a result of the detecting to the processor through the wireless communication unit.

The wearable apparatus may further include a support frame configured to support the body of the user when the wearable apparatus is worn on the body and transmit the generated power to the user.

One end portion of the output link may be connected, directly or indirectly, to the driving module, and the other end portion of the output link may be connected, directly or indirectly, to the support frame.

The processor may be further configured to receive the torque data from the wireless power transmitter through a controller in the driving module when the wireless power transmitter receives the torque data from the wireless power receiver.

According to an embodiment, a wearable apparatus 100, 1100, 1400 to be worn on a body of a user may include a driving module 530, 810, 1120, 1420 configured to generate power to be applied to the user. The wearable apparatus may include an output link 830 connected, directly or indirectly, to the driving module, wherein the output link may include a torque sensor module 820, 1150, 1450 configured to generate torque data by measuring a torque generated by at least one of an operation of the driving module and a motion of the user. The wearable apparatus may include a wireless power transmitter 1130, 1430 configured to perform wireless power transmission. The wearable apparatus may include a wireless power receiver 1140, 1440 configured to receive wireless power transmitted by the wireless power transmitter, convert the received wireless power, and supply the converted wireless power to the torque sensor module. The wearable apparatus may include a wireless communication unit 1460 configured to receive the torque data from the torque sensor module. The wearable apparatus may include a processor 512, 1110, 1410 configured to receive the torque data from the wireless communication unit, generate a control signal for controlling the driving module based on the torque data and motion information of the user, and control the driving module based on the generated control signal.

The wearable apparatus may further include a housing 1020 including the driving module.

A transmission coil 930, 1132, 1432 of the wireless power transmitter may be positioned inside the housing, and a reception coil 910, 1141, 1441 of the wireless power receiver may be positioned on a first surface of the output link so as to face the transmission coil.

The wireless communication unit may be positioned in the output link.

The wearable apparatus may further include a wearing detection sensor positioned in the output link and configured to detect whether the user is wearing the wearable apparatus and transmit a result of the detecting to the processor through the wireless communication unit.

The wearable apparatus may further include a support frame configured to support the body of the user when the wearable apparatus is worn on the body and transmit the generated power to the body.

One end portion of the output link may be connected to the driving module, and the other end portion of the output link may be connected to the support frame.

According to an embodiment, an operating method of a wearable apparatus 100, 1100, 1400 may include applying power generated by a driving module 530, 810, 1120, 1420 to a user, transmitting, by a wireless power transmitter 1130, 1430 in the wearable apparatus, wireless power to a wireless power receiver 1140, 1440 in the wearable apparatus, converting, by the wireless power receiver, the wireless power, supplying, by the wireless power receiver, the converted wireless power to a torque sensor module 820, 1150, 1450 in the wearable apparatus, generating, by the torque sensor module in the wearable apparatus, torque data by measuring a torque generated by at least one of an operation of the driving module and a motion of the user, transmitting, by the wireless power receiver, the torque data to the wireless power transmitter, transmitting, by the wireless power transmitter, the torque data to a processor 512, 1110, 1410, generating, by the processor, a control signal for controlling the driving module based on the torque data and motion information of the user, and controlling, by the processor, the driving module based on the generated control signal.

The torque sensor module may be included in an output link 830 connected to the driving module.

A transmission coil 930, 1132, 1432 of the wireless power transmitter may be positioned inside a housing 1020 including the driving module, and a reception coil 910, 1141, 1441 of the wireless power receiver may be positioned on a first surface of the output link so as to face the transmission coil.

The transmitting of the torque data to the processor may include transmitting, by the wireless power transmitter, the torque data to the processor through a controller (comprising processing circuitry) in the driving module.

The embodiments described above may apply to a robot (e.g., a manipulator, etc.) that operates without being worn by a user.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

Accordingly, other implementations are within the scope of the following claims.

What is claimed is:

1. A wearable apparatus to be worn on a body of a user, the wearable apparatus comprising:
a driving module, comprising a motor and/or circuitry, configured to generate power to be applied to the user;
an output link connected to the driving module, the output link comprising a torque sensor module, comprising a sensor, configured to generate torque data at least by measuring a torque generated by at least one of an operation of the driving module and a motion of the user;
a wireless power transmitter configured to perform wireless power transmission;
a wireless power receiver configured to receive wireless power transmitted by the wireless power transmitter, convert the received wireless power, supply the converted wireless power to the torque sensor module, receive the torque data from the torque sensor module, and transmit the received torque data to the power transmitter; and
at least one processor configured to receive the torque data from the wireless power transmitter via the driving module, generate a control signal for controlling the driving module based on the torque data and motion information of the user, and control the driving module based on the generated control signal.

2. The wearable apparatus of claim 1, further comprising:
a housing,
wherein a transmission coil of the wireless power transmitter is positioned inside the housing, and a reception coil of the wireless power receiver is positioned on a first surface of the output link so as to face the transmission coil.

3. The wearable apparatus of claim 1, wherein
the output link and the torque sensor module are integrated.

4. The wearable apparatus of claim 1, further comprising:
a wireless communication unit, comprising communication circuitry, configured to provide a wireless communication link with the at least one processor and transmit the torque data to the at least one processor via the wireless communication link.

5. The wearable apparatus of claim 4, wherein
the wireless communication unit is positioned in the output link.

6. The wearable apparatus of claim 4, further comprising:
a wearing detection sensor positioned in the output link and configured to detect whether the user is wearing the wearable apparatus and transmit a result of the detecting to the at least one processor via the wireless communication unit.

7. The wearable apparatus of claim 1, further comprising:
a support frame configured to support at least part of the body of the user when the wearable apparatus is worn on the body and transmit the generated power to the user.

8. The wearable apparatus of claim 7, wherein
one end portion of the output link is connected to the driving module, and the other end portion of the output link is connected to the support frame.

9. The wearable apparatus of claim 1, wherein
the at least one processor is further configured to receive the torque data from the wireless power transmitter through a controller in the driving module when the wireless power transmitter receives the torque data from the wireless power receiver.

10. A wearable apparatus to be worn on a body of a user, the wearable apparatus comprising:
a driving module, comprising a motor and/or circuitry, configured to generate power to be applied to the user;
an output link connected to the driving module, the output link comprising a torque sensor module, comprising a sensor, configured to generate torque data at least by measuring a torque generated by at least one of an operation of the driving module and a motion of the user;
a wireless power transmitter configured to perform wireless power transmission;
a wireless power receiver configured to receive wireless power transmitted by the wireless power transmitter, convert the received wireless power, and supply the converted wireless power to the torque sensor module; and
a wireless communication unit, comprising communication circuitry, configured to receive the torque data from the torque sensor module; and
at least one processor configured to receive the torque data from the wireless communication unit, generate a control signal for controlling the driving module based on the torque data and motion information of the user, and control the driving module based on the generated control signal.

11. The wearable apparatus of claim 10, further comprising:
a housing,
wherein a transmission coil of the wireless power transmitter is positioned inside the housing, and a reception coil of the wireless power receiver is positioned on a first surface of the output link so as to face the transmission coil.

12. The wearable apparatus of claim 10, wherein
the output link and the torque sensor module are integrated.

13. The wearable apparatus of claim 10, wherein
the wireless communication unit is positioned in the output link.

14. The wearable apparatus of claim 10, further comprising:
a wearing detection sensor positioned in the output link and configured to detect whether the user is wearing the wearable apparatus and transmit a result of the detecting to the at least one processor via the wireless communication unit.

15. The wearable apparatus of claim 10, further comprising:
a support frame configured to support at least part of the body of the user when the wearable apparatus is worn on the body and transmit the generated power to the body.

16. The wearable apparatus of claim 15, wherein
one end portion of the output link is connected to the driving module, and the other end portion of the output link is connected to the support frame.

17. An operating method of a wearable apparatus, the operating method comprising:
applying power generated by a driving module, comprising a motor and/or circuitry, to a user;
transmitting, by a wireless power transmitter in the wearable apparatus, wireless power to a wireless power receiver in the wearable apparatus;
converting, by the wireless power receiver, the wireless power;

supplying, by the wireless power receiver, the converted wireless power to a torque sensor module, comprising a sensor, in the wearable apparatus;

generating, by the torque sensor module in the wearable apparatus, torque data at least by measuring a torque generated by at least one of an operation of the driving module and a motion of the user;

transmitting, by the wireless power receiver, the torque data to the wireless power transmitter;

transmitting, by the wireless power transmitter, the torque data to at least one processor;

generating, by the at least one processor, a control signal for controlling the driving module based on the torque data and motion information of the user; and controlling, by the at least one processor, the driving module based on the generated control signal.

18. The operating method of claim 17, wherein
the torque sensor module is included in an output link connected to the driving module.

19. The operating method of claim 17, wherein
a transmission coil of the wireless power transmitter is positioned inside a housing comprising the driving module, and
a reception coil of the wireless power receiver is positioned on a first surface of the output link so as to face the transmission coil.

20. The operating method of claim 17, wherein
the transmitting of the torque data to the at least one processor comprises transmitting, by the wireless power transmitter, the torque data to the at least one processor via a controller in the driving module.

* * * * *